United States Patent
Roberts et al.

(10) Patent No.: US 11,321,614 B2
(45) Date of Patent: May 3, 2022

(54) DIRECTED TRAJECTORIES THROUGH COMMUNICATION DECISION TREE USING ITERATIVE ARTIFICIAL INTELLIGENCE

(71) Applicant: Oracle International Corporation, Redwood Shores, CA (US)

(72) Inventors: Tara U. Roberts, Austin, TX (US); Alberto Polleri, London (GB); Rajiv Kumar, Austin, TX (US); Ranjit Joseph Chacko, San Francisco, CA (US); Jonathan Stanesby, Wokingham (GB); Kevin Yordy, Denver, CO (US)

(73) Assignee: Oracle International Corporation, Redwood Shores, CA (US)

(*) Notice: Subject to any disclaimer, the term of this patent is extended or adjusted under 35 U.S.C. 154(b) by 838 days.

(21) Appl. No.: 16/146,678

(22) Filed: Sep. 28, 2018

(65) Prior Publication Data
US 2019/0102681 A1    Apr. 4, 2019

Related U.S. Application Data

(63) Continuation-in-part of application No. 16/007,677, filed on Jun. 13, 2018.

(60) Provisional application No. 62/566,026, filed on Sep. 29, 2017.

(51) Int. Cl.
*G06N 5/02*    (2006.01)
*G06N 20/00*    (2019.01)

(52) U.S. Cl.
CPC ............... *G06N 5/02* (2013.01); *G06N 20/00* (2019.01)

(58) Field of Classification Search
CPC .................................. G06N 5/02; G06N 20/00
See application file for complete search history.

(56) References Cited

U.S. PATENT DOCUMENTS

| | | | |
|---|---|---|---|
| 7,305,345 B2 | 12/2007 | Bares et al. | |
| 7,392,162 B1 | 6/2008 | Srinivasan et al. | |
| 8,321,371 B2 | 11/2012 | Bridges et al. | |
| 8,977,641 B1* | 3/2015 | Crichton | G06Q 50/01 707/767 |
| 9,665,641 B1 | 5/2017 | Zhang | |
| 9,674,154 B1 | 6/2017 | Canavor et al. | |
| 9,785,715 B1 | 10/2017 | Busey et al. | |
| 10,044,650 B1 | 8/2018 | Gupta | |

(Continued)

FOREIGN PATENT DOCUMENTS

| | | |
|---|---|---|
| CN | 105631707 | 6/2016 |
| WO | 2006132759 | 12/2006 |
| WO | 2017147785 A1 | 9/2017 |

OTHER PUBLICATIONS

Sha, D. Y., and C-H. Liu. "Using data mining for due date assignment in a dynamic job shop environment." The International Journal of Advanced Manufacturing Technology 25.11-12 (2005): 1164-1174. (Year: 2005).*

(Continued)

*Primary Examiner* — Kevin W Figueroa
(74) *Attorney, Agent, or Firm* — Kilpatrick Townsend & Stockton LLP

(57) ABSTRACT

Embodiments relate to configuring artificial-intelligence (AI) decision nodes throughout a communication decision tree. The decision nodes can support successive iteration of AI models to dynamically define iteration data that corresponds to a trajectory through the tree.

20 Claims, 14 Drawing Sheets

(56) References Cited

U.S. PATENT DOCUMENTS

| | | | |
|---|---|---|---|
| 10,089,983 | B1 | 10/2018 | Gella et al. |
| 10,129,157 | B2 | 11/2018 | Fan et al. |
| 10,423,628 | B2 | 9/2019 | Bolcer et al. |
| 10,796,228 | B2 | 10/2020 | Roberts et al. |
| 10,904,298 | B2 | 1/2021 | Sondhi et al. |
| 2006/0026203 | A1 | 2/2006 | Tan et al. |
| 2009/0058859 | A1 | 3/2009 | Crawford et al. |
| 2010/0070457 | A1 | 3/2010 | Kejariwal et al. |
| 2010/0082400 | A1 | 4/2010 | Bagherjeiran et al. |
| 2011/0055098 | A1 | 3/2011 | Stewart |
| 2012/0150626 | A1 | 6/2012 | Zhang et al. |
| 2012/0303790 | A1 | 11/2012 | Singh et al. |
| 2013/0346259 | A1 | 12/2013 | Lakshana et al. |
| 2013/0346886 | A1 | 12/2013 | Cauchois et al. |
| 2014/0089495 | A1 | 3/2014 | Akolkar et al. |
| 2014/0095617 | A1 | 4/2014 | Chan et al. |
| 2014/0122355 | A1 | 5/2014 | Hardtke et al. |
| 2014/0358828 | A1 | 12/2014 | Phillipps et al. |
| 2014/0365358 | A1 | 12/2014 | Higaki et al. |
| 2015/0006294 | A1 | 1/2015 | Irmak et al. |
| 2015/0161566 | A1 | 6/2015 | Cai |
| 2016/0004705 | A1 | 1/2016 | Petrocik et al. |
| 2016/0132800 | A1 | 5/2016 | Davar et al. |
| 2016/0328715 | A1 | 11/2016 | Gideoni et al. |
| 2016/0350406 | A1 | 12/2016 | Byron et al. |
| 2016/0358240 | A1 | 12/2016 | Redfern et al. |
| 2017/0006342 | A1 | 1/2017 | Nagaraja Rao et al. |
| 2017/0061382 | A1 | 3/2017 | Zhang et al. |
| 2017/0061472 | A1 | 3/2017 | Mathis |
| 2017/0180284 | A1 | 6/2017 | Smullen et al. |
| 2017/0193451 | A1 | 7/2017 | Fang |
| 2017/0193452 | A1 | 7/2017 | Wang et al. |
| 2017/0344556 | A1 | 11/2017 | Wu et al. |
| 2018/0060749 | A1 | 3/2018 | Yan et al. |
| 2018/0084078 | A1 | 3/2018 | Yan |
| 2018/0218127 | A1* | 8/2018 | Salazar .................. G16H 50/30 |
| 2018/0225714 | A1 | 8/2018 | Lewis et al. |
| 2018/0232592 | A1 | 8/2018 | Stewart et al. |
| 2018/0302335 | A1 | 10/2018 | Gao et al. |
| 2018/0308124 | A1 | 10/2018 | Gao et al. |
| 2019/0050427 | A1 | 2/2019 | Wiesel et al. |
| 2019/0190798 | A1 | 6/2019 | Asthana et al. |
| 2019/0245757 | A1 | 8/2019 | Meyer et al. |

OTHER PUBLICATIONS

International Application No. PCT/US2018/051421, International Search Report and Written Opinion dated Jan. 7, 2019, 13 pages.
International Application No. PCT/US2018/051422, International Search Report and Written Opinion dated Jan. 4, 2019, 10 pages.
U.S. Appl. No. 16/007,787, Non-Final Office Action dated Feb. 5, 2020, 11 pages.
International Application No. PCT/US2018/051421, International Preliminary Report on Patentability dated Apr. 9, 2020, 9 pages.
International Application No. PCT/US2018/051422, International Preliminary Report on Patentability dated Apr. 9, 2020, 6 pages.
U.S. Appl. No. 16/007,787, Notice of Allowance dated Jun. 4, 2020, 9 pages.
U.S. Appl. No. 16/586,365, Notice of Allowance dated Oct. 1, 2020, 6 pages.
AI For Recruiting: A Definitive Guide For HR Professionals, Available on internet at: https://ideal.com/ai-recruiting/, Jan. 31, 2018, 11 pages.
Eve, Zendesk Support, "Best practices: Answer Bot customer service for agents", retrieved from https://support.zendesk.com/hc/en-us/articles/115011229087-Best-practices-Answer-Bot-customer-service-for-agents, Feb. 1, 2018, 3 pages.
Faliagka et al., Application of Machine Learning Algorithms to an online Recruitment System, ICIW 2012: The Seventh International Conference on Internet and Web Applications and Services, Available on internet at: http://citeseerx.ist.psu.edu/viewdoc/download?doi=10.1.1.885.909&rep=rep1&type=pdf, Jan. 2012, pp. 215-220.
Huang, et al., "Extracting Chatbot Knowledge from Onlin Discussion Forums", retrieved from https://www.aaai.org/Papers/IJCAI/2007/IJCAI07-066.pdf, Jan. 6, 2007, 6 pages.
Mortimer, "Introducing Answer Bot—Automatic Article Suggestions for Better Self-Service Support", retrieved from https //support.zendesk.com/hc/en-us/articles/115010891827-Introducing-Answer-Bot-Automatic-article-suggestions-for-better-self-service-support, Aug. 2017.
O'Neill, How Vector Space Matching Technology is One-Upping the ATS Ability to Unearth Your Top Applicants, Available on internet at: https://www.mightyrecruiter.com/blog/author/heather/, Feb. 15, 2017, 3 pages.
Pleasant, "Zendesk Adds Answer Bot to Zendesk Guide". Unified Communications Strategies, Aug. 22, 2017, 2 pages.
Spanier, "Working with Answer Bot (for Agents)", retrieved from https://support.zendesk.com/hc/en-us/articles/115010243928, Jul. 2017, 6 pages.
Zendesk, "Guide: Zendesk's New Solution That Uses Machine Learning to Resolve Customer Queries", https://techseen.com/2017/05/04/zendesk-guide-machine-learning/, May 4, 2017, 5 pages.
Zendesk, "Virtual Customer Assistant-Answer Bot", retrieved from https://www.zendesk.com/answer-bot/, Jan. 30, 2018, 7 pages.
Zendesk, "What Zendesk is Made of", zendesk, retrieved from https://www.zendesk.co.uk/product/tech-specs/, Feb. 1, 2018, 14 pages.
Zimmermann et al., Data-driven HR Resume Analysis Based on Natural Language Processing and Machine Learning, Available on internet at: https://arxiv.org/pdf/1606.05611.pdf, Jun. 21, 2016, 6 pages.
European Application No. 18860548.9, Extended European Search Report dated Jul. 7, 2021, 9 pages.
European Application No. 18863611.2, Extended European Search Report dated Jun. 15, 2021, 8 pages.
U.S. Appl. No. 16/007,677, Non-Final Office Action, dated Jul. 15, 2021, 22 pages.
U.S. Appl. No. 16/007,762 received a Non-Final Office Action dated Dec. 14, 2021, 12 pages.

* cited by examiner

700

Adaptive intelligence switch ✕

Stage label

New Content Notification

Description

Select metric

Conversion ▾

Paths

Default Path

Email - Content #1

Constrain — Boost

Other Path 1

Email - Content #2

Constrain — Boost

Other Path 2

No Action

Constrain — Boost

Default Communication Time

After 1 day ▾

Cancel | Done

DIRECTED TRAJECTORIES THROUGH COMMUNICATION DECISION TREE USING ITERATIVE ARTIFICIAL INTELLIGENCE

CROSS-REFERENCE TO RELATED APPLICATIONS

This application is a continuation-in-part of U.S. application Ser. No. 16/007,677, filed on Jun. 13, 2018, which claims the benefit of and the priority to U.S. Provisional Application No. 62/566,026, filed on Sep. 29, 2017. Each of these applications is hereby incorporated by reference in its entirety for all purposes.

BACKGROUND

Technological advancements have improved the accessibility and complexity of multiple types of communication channels. Further, data-storage and network advancements have increased capacities, such that an increasing amount (and variety) of data can be stored at a data source for potential transmission. Therefore, a data source can be positioned to deliver many types of data across any of multiple data channels at many potential times. The array of content-delivery options explodes when considering multiple, related content deliveries instead of a single distribution. Frequently, a content provider configures one or more static rules to indiscriminately provide the same content through a same communication channel to each data ingester. While the communication specification(s) may differ across receipt of different data requests, the rule(s) can be configured to indiscriminately and consistently respond to data requests. Though this approach provides configuration simplicity and deterministic operation, it fails to react to the potential variability across a population of data ingesters and thus may sub-optimally handle requests.

SUMMARY

In some embodiments, a computer-implemented method is provided. A data structure is accessed that represents a communication decision tree configured to dynamically define individual trajectories through the communication decision tree using a machine-learning technique to indicate a series of communication specifications. The communication decision tree includes a set of branching nodes. Each branching node of the set of branching nodes corresponds to an action point configured to identify a direction for a given trajectory. At a first time, it is detected that a trajectory through the communication decision tree has reached a first branching node of the set of branching nodes. The trajectory is associated with a particular user. In response to the detecting that the trajectory has reached the first branching node, first learned data generated by processing first user data using a machine-learning technique is retrieved. The first user data includes user attributes for a set of other users. Further in response to the detecting that the trajectory has reached the first branching node, one or more particular user attributes associated with the particular user are retrieved, one or more first communication specifications are identified based on the first learned data and the one or more particular user attributes, and first content is caused to be transmitted to a user device associated with the particular user in accordance with the one or more first communication specifications. At a second time that is after the first time, it is detected that the trajectory through the communication decision tree has reached a second branching node of the set of branching nodes. In response to the detecting that the trajectory has reached the second branching node, second learned data generated by processing second user data using the machine-learning technique is retrieved. The second user data includes at least some user attributes not included in the first user data. Further in response to the detecting that the trajectory has reached the second branching node, one or more second communication specifications are identified based on the second learned data and at least some of the one or more particular user attributes, and second content is caused to be transmitted to the user device in accordance with the one or more second communication specifications.

In some embodiments, a computer-program product is provided that is tangibly embodied in a non-transitory machine-readable storage medium. The computer-program product can include instructions configured to cause one or more data processors to perform operations of part or all of one or more methods disclosed herein.

In some embodiments, a system is provided that includes one or more data processors and a non-transitory computer readable storage medium containing instructions which, when executed on the one or more data processors, cause the one or more data processors to perform operations of part or all of one or more methods disclosed herein.

BRIEF DESCRIPTION OF THE DRAWINGS

Illustrative embodiments of the present invention are described in detail below with reference to the following drawing figures:

FIG. 7 shows an exemplary parameter-defining interface for a switch icon.

FIG. 8 shows another exemplary parameter-defining interface that includes options to effect a bias towards or against representing various content in communications.

DESCRIPTION

Figure 1:
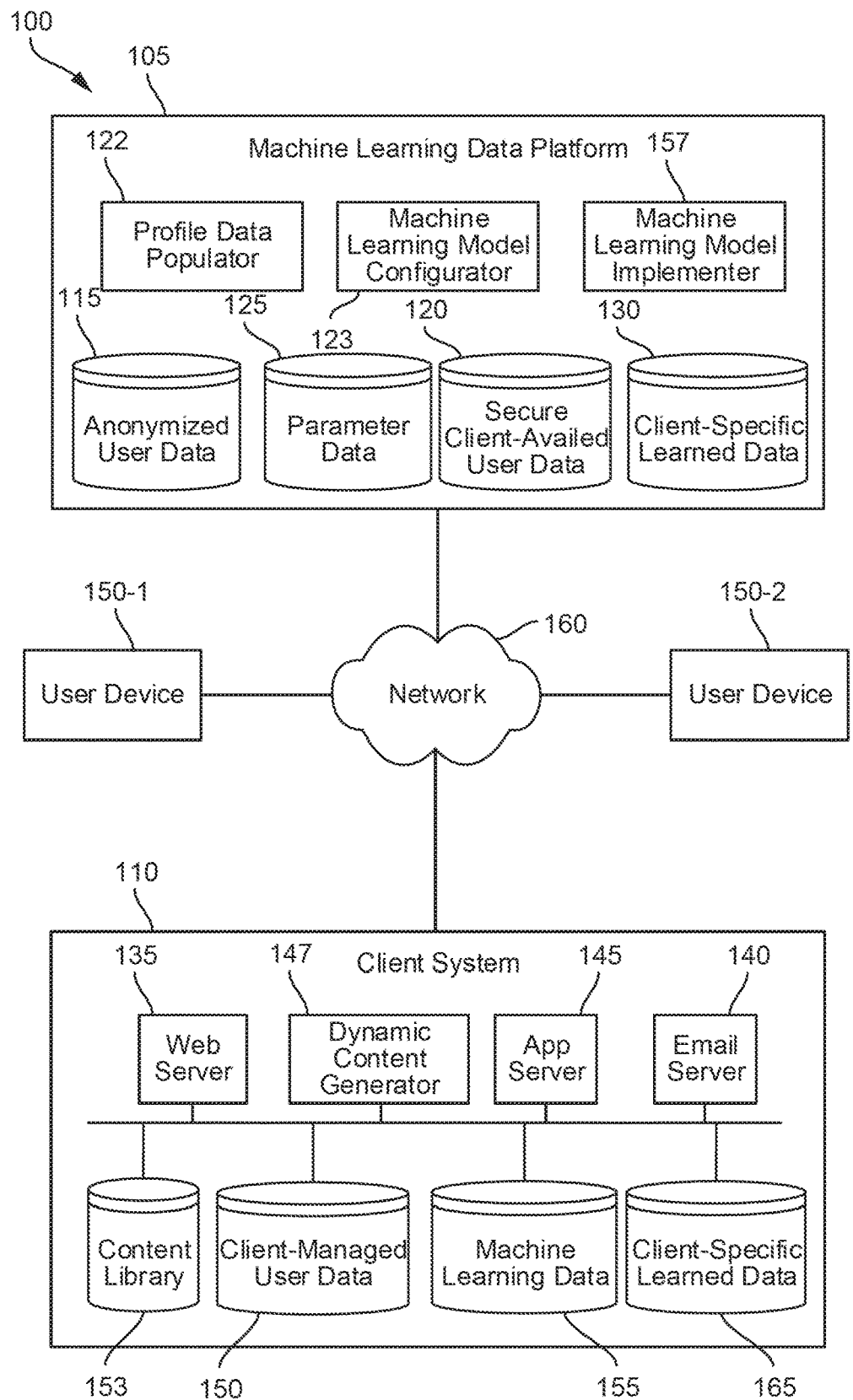
FIG. 1 shows a block diagram of an interaction system.

In some embodiments, systems and methods are provided that repeatedly use machine-learning data to facilitate iteratively identifying communication specifications. More specifically, a communication decision tree is generated that includes a set of nodes. Each node can correspond to (for example) a detected event or a branching node that corresponds to a communication-specification decision and that is connected to multiple next nodes representing a communication corresponding to one or more particular communications specifications. Each individual trajectory through the communication decision tree can correspond to an individual user and/or one or more particular user devices. Each individual trajectory can extend across a particular subset of the set of nodes, where nodes in the subset are representative of specific actions initiated by the user and/or initiated at a particular user device of the one or more particular devices, specific characteristics of a communication transmitted to the a particular user device of the one or more particular devices; and/or a decision to be made as to a specification of an upcoming communication. For example, a specification of an upcoming communication can indicate when it is to be transmitted, to which device it is to be transmitted, over which type of communication channel it is to be transmitted, and/or what type of content it is to include. In some instances, natural language processing can be used to assign one or more categories to each of one or more content objects transmitted in a training set and/or to each of one or more content objects available for transmission. A communication specification may then identify a particular category of content to be transmitted.

Each communication-specification decision can be made based on current data corresponding to the user and/or particular user devices, a machine-learning model and one or more learned parameters for the machine-learning model. The parameter(s) can be learned based on user data associated with a set of other users and that indicates, for each of the set of other users, one or more attributes of the other user and/or a set of events (e.g., user-initiated actions or characteristics of communications transmitted to the user). The parameter(s) can further be learned based on a trajectory target (e.g., identified by a client) that corresponds to a particular node within the communication decision tree and/or a particular action initiated by the user.

A communication decision tree can be configured to include multiple branching nodes, such that multiple communication-specifications decisions may be made for a single trajectory. In some instances, each decision is made using a same type of machine-learning algorithm (e.g., a supervised regression algorithm). However, the algorithm may be differentially configured at each of the branching nodes, such that the branching nodes differ with respect to (for example) the types of input processed for each trajectory and/or the learned parameters to be used to process input corresponding to a trajectory. In various instances, the algorithms for different branching nodes may be trained to optimize a same or different variable (e.g., based on an identification of a same target node or different target nodes). Not only may the branching nodes vary with regard to the types of input that the algorithm is configured to process, but additionally the types of profile data available to potentially be processed for a given user can vary (e.g., profile data may accumulate over time due to interaction monitoring). Further, the learned data associated with any given node can change in time (due to continuous and/or repeated learning).

As one example, a trajectory for a user can be initialized upon detecting that profile data corresponding to the user includes information for at least a predefined set of fields. The profile data can be collected using one or more web servers over one or more sessions associated with the user and/or retrieved from a remote data source. In some instances, a user device automatically detects at least some of the profile data and communicates it to the web server(s) (e.g., via automatically populated header information in a communication that identifies, for example, a unique device identifier, MAC address, browser type, browser version, operating system type, operating system version, device type, language to which the device is set, etc.). In some instances, a communication includes data that represents user input (e.g., text entered into a web form, link selections, page navigation, etc.), which can then be logged as profile data.

Initializing the trajectory can include identifying a first node within the communication decision tree, which can include a first branching node. The first decision node can correspond to a decision as to identify which of multiple content objects (e.g., identifying various groups of items and/or information associated with a web site) to transmit within an email communication to a device of the user. The first decision node can also correspond to a decision as to when—within a two-day period—to send the email. The decisions can be made based on first learned data that indicates—for particular types of users—what types of objects and/or communication times are most likely to lead to a target outcome. For example, the target outcome can include an occurrence where the user activating a link within the email to access a page on the web site and/or the user interacting with the web site in a manner that corresponds to a conversion (e.g., a purchase of an item represented on the web site), and the first learned data can indicate that predictive factors as to which of three content objects will be more effective at resulting in the target outcome include whether a user most frequently uses a mobile device (versus a laptop or computer), the user's age, and previous email-interaction indications as to for which types of content objects the user clicked on a link.

Once the email is sent, the trajectory can extend to a node representing the transmitted content until a next event is detected. The next event can include (for example) activation of a link within the web site, thereby indicating that the user is engaged in a current session with the web site. Upon detecting this event, the trajectory can extend to a second decision node to determine how to configure a requested web page on the web site (e.g., in terms of whether to include dynamic content objects and/or how to arrange various content objects). In this example, second learned data indicates—for particular types of users—what configurations are most likely to lead to a same target outcome. For example, the second learned data can indicate that predictive factors as to which of four configurations will be more effective at resulting in the target outcome include whether a user most frequently uses a mobile device (versus a laptop or computer), a browser type, a current location of a user device, and a current time of day at the user's location. Once the webpage (configured in accordance with the decision made at the second decision node) is sent, the trajectory can extend to a node representing the configuration of the transmitted webpage. The trajectory can continue to extend upon detecting various user-initiated, system-initiated or external events (e.g., a passing of a predefined time interval since a previous event).

In this example, the target outcome remains the same across multiple decisions. However, rather than identifying a static workflow of actions to perform—or even rather than determining a user-specific complete sequence of actions to perform—techniques disclosed herein base decisions pertaining to individual actions on current profile data, current learned data and current event detections. Machine learning is executed iteratively throughout a life cycle of a particular trajectory to identify piecemeal actions to be performed. This approach can facilitate high utilization of data (e.g., as expansions and/or evolutions of learned data and/or profile data can be utilized in mid-process decisions), which can promote achieving the target objective. Further, the approach enables a change (e.g., initiated by a client) to a definition and/or constraint of a machine-learning technique to take a quick effect (e.g., as the change can still influence trajectories having already been initiated). For example, a client may change a target objective from conversion to retaining a user device on a web site for at least a threshold session duration. Modified parameters for machine-learning models associated with various branching nodes can be determined and immediately effected, so as to affect previously initiated trajectories that subsequent reach the node(s).

Communication decisions (and/or partial directing through a communication decision tree) can be based on anonymized or partially anonymized data, either or both of which can be built from anonymized, partially anonymized or non-anonymized data provided by one or more providers or clients. For example, a remote user-data management system can receive partially anonymized or non-anonymized data from one or more data providers and can obscure or eliminate fields in individual records according to data-privacy rules and/or can aggregate field values across a user sub-population to comply with data-privacy rules. As described herein, anonymized or partially anonymized data is data that has been stripped of PII and/or aggregated such that individual data values cannot be, beyond a certain probability, associated with particular people or users. Thus, the anonymized or partially anonymized data can lack or obscure sufficient data values to prevent identifying a particular person as being a particular user or to prevent identifying a particular person as having at least a threshold probability as being a user. For example, the anonymized or partially anonymized data may lack a name, email address, IP address, physical address and/or phone number from profile data. The anonymized or partially anonymized data may include or exclude certain demographic data, such as an age, city, occupation, etc. In some instances, anonymized or partially anonymized data is useful to collect so as to comply with privacy rules, regulations and laws, while also being able to process some of the data. The anonymized or partially anonymized data can include information gathered from devices based on IP address range, zip code, date, categories of prior online inquiry, race, gender, age, purchase history, and/or browsing history, etc., which may have been gathered according to a variety of privacy policies and laws that restrict the flow of personally identifiable information (PII), etc.

In some instances, the anonymized or partially anonymized data is used to generate and/or update learned data (e.g., one or more parameters) associated with individual machine-learning configurations. This type of training need not (for example) require or benefit from data fields such as contact information, so data records can be stripped of these fields. As another example, one or more sub-populations can be generated based on values for a particular field, and specific values for that field may thereafter be replaced with an identifier of a sub-population.

In some instances, profile data corresponding to a particular user for which decisions are being made include the anonymized or partially anonymized data. For example, a system can detect that a trajectory has reached a branching node and request data from a user-data management system (e.g., using a device identifier or other identifier associated with the trajectory). The system can return profile data that includes (for example) one or more specific non-anonymized field values, one or more field values that have been generalized (e.g., assigned to a category), and/or eliminated field values. The non-anonymized field data may be included in profile data when (for example) such field values were supplied by (e.g., upon having been collected using data-collecting features built into a webpage and/or via a transmission from the client) or otherwise accessible to (e.g., via a data-sharing agreement) a client for which a decision is being made. The system may also return population data (e.g., that can itself be learned and/or can evolve over time) that indicates relationships between field values, which may be used to estimate values or categories for missing field values.

FIG. 1 shows a block diagram of an interaction system 100. A machine learning data platform 105 can include one or more cloud servers and can be configured to receive user data from one or more client systems 105. The user data can include anonymized or partially anonymized user data (stored in an anonymized user data store 115) and/or secure client-availed user data (stored in a secure client-availed user data store 120), which may be less anonymized than anonymized user data or not anonymized. When secure client-availed user data is received, it may be securely stored in association with an identifier of a client, such that other clients cannot gain access to the data. The data may be stored in a multi-tenant cloud storage system such that multiple clients can log in to a central location to access a server or collection of servers, but where the specific access to data is controlled depending on which client has authenticated to the cloud storage system. Anonymized or partially anonymized user data may, or may not, be particularly configured for various clients (e.g., depending on which data the client supplied and/or data-sharing agreements associated with the client). Thus, a profile data populator 122 at machine learning data platform 105 can generate profile data corresponding to one or more individual users for particular clients and can customize which field values are included in the profile data for individual clients.

In some instances, profile data populator 122 enhances a profile data set to supplement client-availed user data with partially anonymized user data, which can (as aggregated) define client-specific learned data (stored in a client-specific learned data store 130) for a given user. For example, data from a profile in the client-availed data can be mapped to one or more data sets in the anonymized or partially anonymized user data, such that richer data sets can be used in the machine-learning analyses. The mapping may occur using overlapping data (e.g., an IP address, if included in the anonymized or partially anonymized user data, a purchase time, a pseudo-random user identifier assigned by a client, etc.).

A machine learning model confugerer 123 can configure a given machine learning model based on (for example) an identified target outcome, available training data, one or more client-identified constraints and/or potential actions as indicated by a communication decision tree and/or by a client. Configuring the machine learning model can include defining one or more parameters for a particular instance of the model (e.g., the instance being associated with a particular branching node, client and/or time period).

Each parameter can be indicative of a relationships and/or correlation between user attributes (stored in a learned parameter data store 125). The parameter(s) can include a weight that indicates how and/or an extent to which a first user attribute is predictive of a second user attribute that corresponds to an indication as to whether and/or an extent to which a target outcome occurred. The weight may be defined along a discrete or continuous value range and/or can be binary.

As one example, the parameter(s) can indicate which attributes from amongst a set of attributes are predictive of future occurrence of a particular type of conversion event. For example, it may be determined that having visited a webpage associated with a "travel" tag more than twice in the last month was a predictor of buying a piece of luggage. As another example, it may be determined that having visited a movie-review webpage within a given day was a predictor for later purchasing an online rental of a movie. Indirect associations and trends may also be learned, such as identifying there is an inverse correlation between an age of the user and an average time spent online each day. Each parameter may be associated with a strength and/or confidence of a relationship, optionally with serial associations between the data points gathered and the conclusions being made, where each association in serial carries a certain probability that the data at the start of the association is accurate for what it says and a certain other probability that the association itself is accurate.

The configuring may, but need not, be performed using client-availed profile data and/or to produce client-specific parameters. The client-specific parameter(s) may be, for example, a modified version of the parameter(s) generated using the anonymized or partially anonymized profile data.

Various machine-learning techniques may be used to generate learned data. For example, a machine-learning technique may use decision-tree learning, association-rule learning, an artificial neural network, deep learning, inductive logic programming, a support vector machine, clustering, a Bayesian network, reinforcement learning, representation learning, similarity and metric learning, sparse dictionary learning, a genetic algorithm, or rule-based machine learning. In some instances, a machine-learning technique includes an ensemble technique, which learns inter-ensemble weights to apply to results produced from various underlying techniques (such as two or more of those previously mentioned). The inter-ensemble weights may be identified based on (for example) accuracy, speed and/or resource usage associated with the underlying techniques.

Training a machine-learning technique (to identify one or more parameters) can include identifying how a set of observed inputs (e.g., content of a marketing email, content of a promotion, and/or the configuration of a web site) relates to a set of corresponding outputs (e.g., an outcome, such as the presence or absence of certain conversion event, for a corresponding marketing email, a corresponding promotion, and/or a corresponding web site configuration). These observed observations can be used to identify modeled relationships and/or trends, with a goal of predicting candidate factual information (e.g., a predicted next input to be received or a predicted output based on certain inputs) that has not yet occurred based on factual information leading up to the candidate factual information. Each prediction can carry a confidence or probability, and chains of predictions have a combined confidence or probability.

Thus, machine learning model configurator 123 can identify model parameters for particular client systems 110 based on (for example) target outcomes, client-specific profile data and/or machine-learning techniques. Client-specific learned data can be selectively shared with a client system having provided the underlying client-availed profile data. Client system 110 can include a system that hosts one or more web sites, hosts one or more apps and/or causes emails to be transmitted. For example, client system 110 can include a web server 135 that receives and responds to HTTP requests for pages on one or more domains and an email server 140 that delivers emails to users' email addresses. Client system 110 may further or alternatively include an app server 145 to receive and respond to requests received via an application executing on a user device. Thus, one or more servers at client system 110 can be configured to detect requests from one or more user devices 150-1, 150-2 and/or trigger transmission of content to one or more user devices 150-1, 150-2. User devices 150-1, 150-2 may include, for example, a computer, smart phone, tablet, etc. It will be appreciated that, in various circumstances, a single user device may be associated with a single user or more than one users. Further, a single user may be associated with a single user device or more than one user devices.

Web server 135 and/or app server 145 may store indications of requests for content (e.g., a webpage or app page) from a content library 153 as user data in a client-managed user data store 150. The stored data may include automatically detected information (e.g., a request time) along with information included in the request (e.g., a device identifier, IP address, requested webpage, user-entered input, etc.). Storing the data may include updating a profile to include the data. Web server 135, email server 140 and/or app server 145 may further store data in client-managed user data store 150 that indicates which content was distributed to particular user devices (e.g., by identifying a transmission time, user-device identifier, content-object identifier(s), and/or type of communication).

Client system 110 can transmit at least part of the user data from client-managed user data store 150 to machine learning data platform 105, which can store it in secure client-availed user data store 120. The transmission(s) may occur periodically, during a request for client-specific learned data, at regular time intervals, etc. In some instances, client system 110 at least partly anonymizes some or all of the user data (e.g., by omitting or obscuring values for at least some fields) before transmitting it to machine learning data platform (e.g., such that it is stored as anonymized or partially anonymized user data at the platform). In some instances, the data is not at least partly anonymized, such that the data is either stored in secure client-availed user data store 120 or is at least partially anonymized at machine learning data platform 105. For some datasets, the anonymized or partially anonymized data is received from a third party, after being stripped of PII, and stored by client system 110 without ever having access to the non-anonymized data. In some embodiments, the anonymized or partially anonymized data is natively anonymized or partially anonymized. In these embodiments, websites may run embed scripts on their web sites that, when executed, gather anonymized or partially anonymized data about accesses of the web sites by users. The scripts may gather only information that may be gleaned without knowing a user's personal information and stored in a data cloud that ensures that user identity can never be deduced beyond a certain probability.

Client system 110 can store machine-learning data in a machine learning data store 155. In some instances, the machine learning data includes an indication of one or more decisions made at a branching node for a given trajectory, one or more content specifications identified using a communication decision tree and/or one or more parameters. The machine-learning data can be requested from, received from and/or derived from data from machine learning platform 105. For example, in some instances, machine learning model configurator 123 causes parameters generated for and/or applicable to a client to be transmitted to client system 110. As another example, a machine learning model implementor 157 can apply machine learning model configured with particular parameters to particular profile data to identify one or more particular communications specifications to define a communications action to be taken for a client (and/or a next node of a trajectory) that corresponds to the profile data. Machine learning model implementor 157 can then cause an indication of the identified communications action and/or the next node to be transmitted in association with an identifier of a trajectory, user and/or user device.

Identifying a next node and/or communications specification(s) can include running a machine learning model (associated with a current branching node) using particular profile data and one or more learned parameters. A result can indicate (for example) which of various content-presentation characteristics is associated with a high (e.g., above-threshold) or highest probability of leading to a particular target outcome (e.g., target conversion). In some instances, the analysis includes identifying one or more content-presentation characteristics associated with a highest probability of leading to a particular conversion target outcome. In some instances, the analysis balances the probabilities of leading to a particular conversion results with a predefined cost metric associated with various content-presentation characteristics.

In some instances, running the machine learning model using the parameters (e.g., at machine learning data platform 105 or client system 110) can include (for example) performing a regression analysis using the profile data and parameters to generate a number that can be compared to one or more thresholds. The one or more thresholds can define two or more ranges (e.g., open-ended or closed ranges), with each range corresponding to a particular next node and/or communications action. In some instances, running the machine learning model using the parameters can include processing at least part of the profile data and at least part of the parameters to produce a result that can be compared to (e.g., via calculation of a difference, calculation of a cost using a cost function, etc.) each of a set of reference data variables (e.g., single values, a vector, a matrix; a time series, etc.)—each being associated with a particular next node and/or communications action and each potentially defined at least in part based on a parameter. A node or communication associated with a reference data variable for which the comparison indicated a closest correspondence can be selected.

A dynamic content generator 147 can trigger a presentation of a content object in accordance with the selected communication specification(s). To generate an appropriate instruction, dynamic content generator 147 may first identify what communication channel is to be used to transmit the object, the type of object that is to be transmitted, a version of content that is to be transmitted and/or when the content object is to be transmitted. The identification can be determined based on (for example) a result of an implementation of a machine learning model, a configuration of a machine learning model (e.g., which may restrain potential options with respect to one or more of these options), and/or one or more parameters.

Dynamic content generator 147 can identify a type of communication (e.g., email, SMS message, pop-up browser window or pushed app alert) to be transmitted, which can inform (for example) which of web server 135, email server 140 and/or app server 145 is to transmit the communication. The identification can be made explicitly (e.g., based on a machine-learning result, parameter, and/or machine-learning-model configuration) or implicitly (e.g., due to a selected content object being of a particular type).

Identifying the content object can include selecting from amongst a set of existing content objects or generating a new content object. The content object can include (for example) a webpage, an object within a webpage, an image, a text message, an email, an object within an email and/or text. In some instances, a result of executing a configured machine-learning model on profile data identifies a particular content object. In some instances, a result identifies a characteristic of content (e.g., having a particular metadata category) and/or identifies a particular technique for selecting content. For example, a result may indicate that a "tools" item is to be featured in a content object and/or that a communication is to include four content objects that correspond to four different (though unspecified) categories. In such instances, dynamic content generator 147 can (for example) select from amongst a set of potential content objects using a selection technique that is (for example) indicated via a result of the machine-learning implement, via a parameter, and/or via a predefined setting. For example, a selection technique may indicate that a selection technique is to include a pseudo-random selection technique, a technique to identify a most recently added object, a technique to identify a highest-conversion object within a set of potential content objects (e.g., having one or more attributes as indicated in a machine-learning result).

In some instances, a time at which a communication is to be transmitted is explicitly identified (e.g., based on a machine-learning result, parameter, and/or machine-learning-model configuration). For example, a time range can be defined as beginning with a current time and ending with a client-identified maximum time. The model may evaluate a set of regularly spaced potential transmission times within the time range. (In some instances, each potential transmission time is considered multiple times in combination with other potential specifications, such as content categories or communication channels.) A machine-learning model result can identify a transmission time associated with a highest probability of resulting in a target outcome. (Notably, if combinations of specifications are considered, the transmission time may include the time in a combination associated with the highest probability. In some instances, a communication is transmitted immediately, upon receiving a next request for content (e.g., corresponding to a given web site or app) from a user device associated with a machine-learning result, or in accordance with a predefined transmission schedule.

In some instances, each specification corresponding to a communication is identified (e.g., during a task and/or using a machine-learning model, a machine-learning configuration, a parameter, a client rule, etc.) at or before the communication is transmitted. Thus, all or some client-controlled configuration of the communication and/or its transmission can be performed prior to transmission of the communication. In some instances, at least one specification corresponding to a communication is identified (e.g., during a task and/or using a machine-learning model, a machine-learning configuration, a parameter, a client rule, etc.) after the communication is transmitted. Thus, at least some client-controlled configuration of the communication and/or its transmission can be performed after transmission of the communication. This post-transmission configuration can thus be based upon learned data and/or profile data that was not available prior to the transmission of the communication. For example, additional profile data corresponding to a user may become available between a first time at which an email was transmitted and a second time at which the email is opened and rendered. The transmitted email can include a script that executes when the email is to be rendered. The script can cause a request to be issued to identify device properties, such as a layout and/or application type. The script can pass these properties along with a request for content to be presented to a server. Thus, the server can select content and/or identify one or more display configurations based on specific rendering information, current profile data and/or current parameters to direct a selection of specific content.

As an additional or alternative example, the communication may contain one or more references or links to pages that, when opened (e.g., in a web browser), render content for display. The pages targeted by the links may include some content that was determined, by the machine learning engine, before or at the time the communication was generated. The pages can further be configured to include content that is to be selected or generated when a request for rendering the pages is detected (e.g., when a script detects activation of a link) and/or when the pages are being generated or rendered (e.g., as indicated by executing a script as part of loading the page). In some instances, a script in the email identifies the content configuration at the time of rendering or at the time that rendering is requested. In some instances, a script executing on the linked page identifies the content configuration.

As one example, a client system may offer online purchases of food delivery. It may be detected that a particular user had looked at a menu for a given restaurant at 2 pm. The client system may retrieve a set of user attributes from a profile data for the user from its client-managed user data. Client-specific learned data may indicate that there is a 76% chance that the user will make a purchase from the restaurant if an email including a discount code is sent in the evening to the user (e.g., as compared to a lower probability associated with other types of communication and other times). In response to determining that the 76% chance is above a 65% threshold for sending a discount threshold, email server 140 transmits an email to the user device. The email includes a script that, when executed, identifies the restaurant and discount to be presented. The user opens the email the next day at 10 am. The code is executed to request the restaurant and discount from the client system. The client system has since received updated public learned correlation data. The client system inputs the time, the user's location (as she is now at work) and prior purchase information to a decision tree built based on the learned data. It is determined that the discount is to be 10% (e.g., to maintain a threshold likelihood of conversion) and the restaurant is to be a deli near the user's work (e.g., to maximize a likelihood of conversion), whereas—had the user opened the email the night before, different user attributes and learned data would have resulted in a 15% discount (e.g., to maintain the threshold likelihood) from an Indian restaurant near the user's home (e.g., to maximize the likelihood). The email includes a link to order from the deli. When the user clicks on the link, the web server determines what content is to be presented—specifically, which food items are to be recommended. The recommendations are based on even more recently updated public learned correlation data, which indicate that salads and sandwiches should be recommended over soup and entrees, as the former options have been recently popular (predicted to be popular due to the warmer weather). Thus, this example illustrates how content presentations can be dynamically customized for a given user based on very recent learned data and user attributes.

Machine learning data platform 105 can generate updated client data based on (for example) any communications received from a user device (e.g., responsive to a workflow action). For example, the updated client data can include one or more new fields generated based on data in a header or payload of a received communication, an indication as to whether (e.g., and when) a particular event was detected, and/or a current or final stage of the workflow to which the profile is assigned. Machine learning data platform 105 can avail the updated client data (e.g., along with corresponding profile identifiers) to client system 110, which can store the updated data in client-specific learned data store 165. Client system 110 may, but need not, separately store the updated data from underlying profile(s).

It will be appreciated that, in some instances, some or all of machine learning data platform can be incorporated within client system 110. In some instances, client system 110 communicates with machine learning data platform during iterations of a communication decision tree. For example, client system 110 (e.g., web server 135 or app server 145 at client system 110) may detect a flag (e.g., included in a URL) in a request for web content or app content received from a user device, where the flag indicates its association with a machine-learning-based workflow). Client system 110 may then alert machine learning model implementor 157 of the request, so that a trajectory can be appropriately updated.

Machine learning data platform, client system 110 and user devices 150-1, 150-2 can communicate over a network 160, which can include, for example, the Internet, a local area network, a wide area network, and so on. It will be appreciated that various alternatives to the depicted and described embodiments are contemplated. For example, some or all of the machine learning may be performed at client system 110. Client system 110 may periodically receive anonymized or partially anonymized user data to process using a machine-learning technique.

Other techniques for using and configuring communication decision trees are detailed in U.S. application Ser. No. 16/007,762, filed on Jun. 13, 2018 (entitled "Methods and Systems for Configuring Communication Decision Trees based on Connected Positionable Elements on Canvas"), and U.S. application Ser. No. 16/007,787, filed on Jun. 13, 2018 (entitled "Machine-Learning Based Processing of De-Obfuscated Data for Data Enrichment"). Each of these applications is hereby incorporated by reference in its entirety for all purposes.

Figure 2:
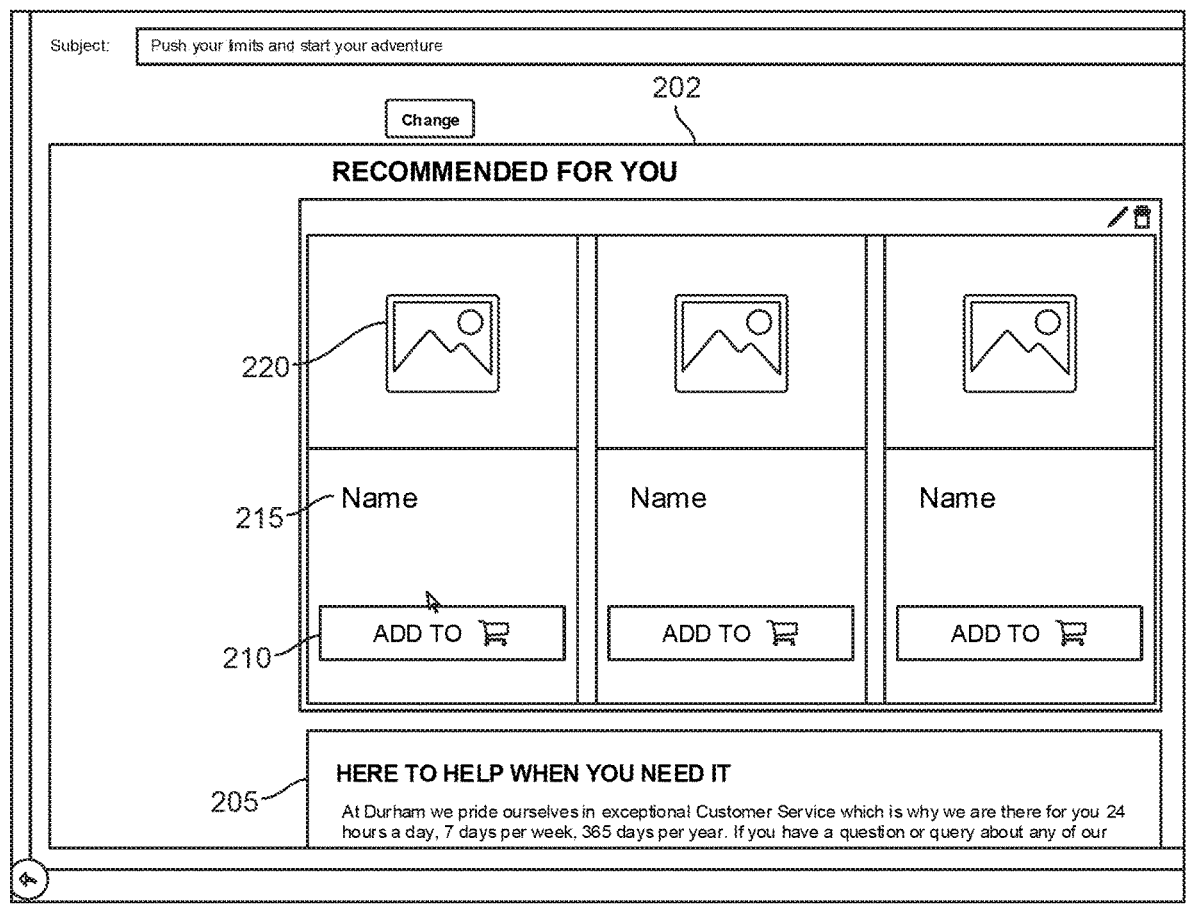
FIG. 2 shows a template to be used for generating an email communication.
Figure 3:
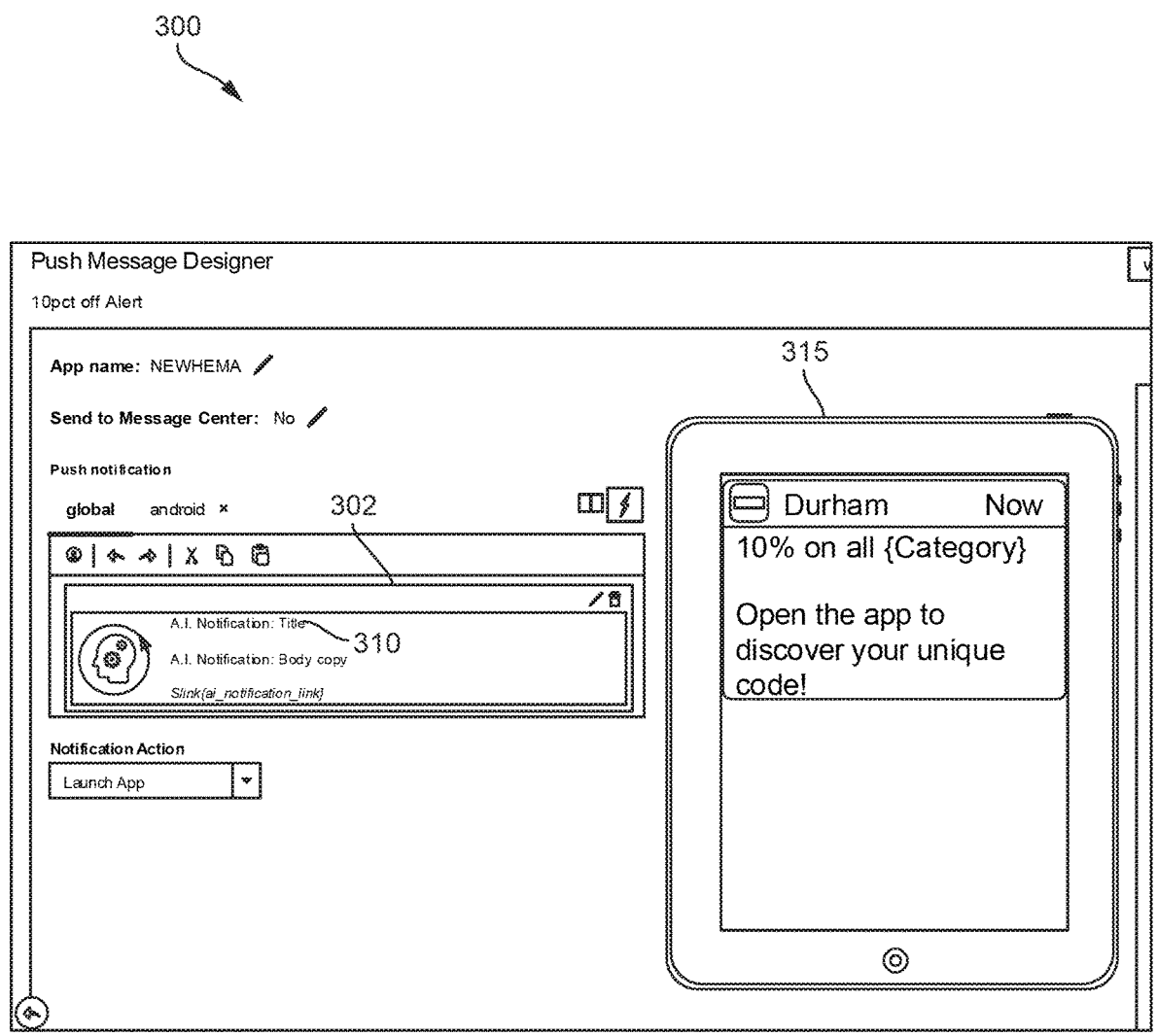
FIG. 3 shows a template to be used for generating an app notification communication.

FIGS. 2 and 3 illustrate interfaces 200 and 300 for configuring templates 202 and 302 for communications configured to be partly configured upon detecting a rendering process or at rendering. The configuring can include executing a configured machine-learning model using current learned configurations of the model and current profile data. Template 202 shown in FIG. 2 includes a template to be used for generating an email communication, and template 302 shown in FIG. 3 includes a template to be used for generating an app notification communication.

Template 202 includes static text (e.g., text 205) and interaction features (e.g., button 210). Template 202 further represents a particular layout, in which three items are to be linearly represented above text 205. Template 202 also include dynamic components (e.g., dynamic text 215 and dynamic image 220) that are configured to be identified when rendering of the email is requested or occurring. Thus, when an email communication is transmitted, the static components can be transmitted along with code configured to (upon detecting a request to render the email) locally identify at least part of current profile data, request at least part of current profile data, request identification of dynamic components, receive or retrieve dynamic components (e.g., identified using current profile data, current anonymized or partially anonymized data and/or current learned parameters) and/or generate a complete email based on the template and dynamic components. The generated email can then be presented.

Template 302 includes a static layout and multiple dynamic text components (e.g., a dynamic title section 310. Template 302 can be configured to be transmitted with a script that facilitates dynamically identifying each dynamic text component. For example, the script can—upon detecting a request to present the notification (e.g., in response to opening an app, clicking on a notification app element, etc.)—locally identify at least part of current profile data, request at least part of current profile data, request identification of dynamic text components, receive or retrieve dynamic text components (e.g., identified using current profile data, current anonymized or partially anonymized data and/or current learned parameters) and/or generate a complete notification based on the template and dynamic text components. The generated notification can then be presented. Interface 300 shows an example of a dynamically generated notification 315 this includes the static layout and particular dynamic text.

Figure 4:
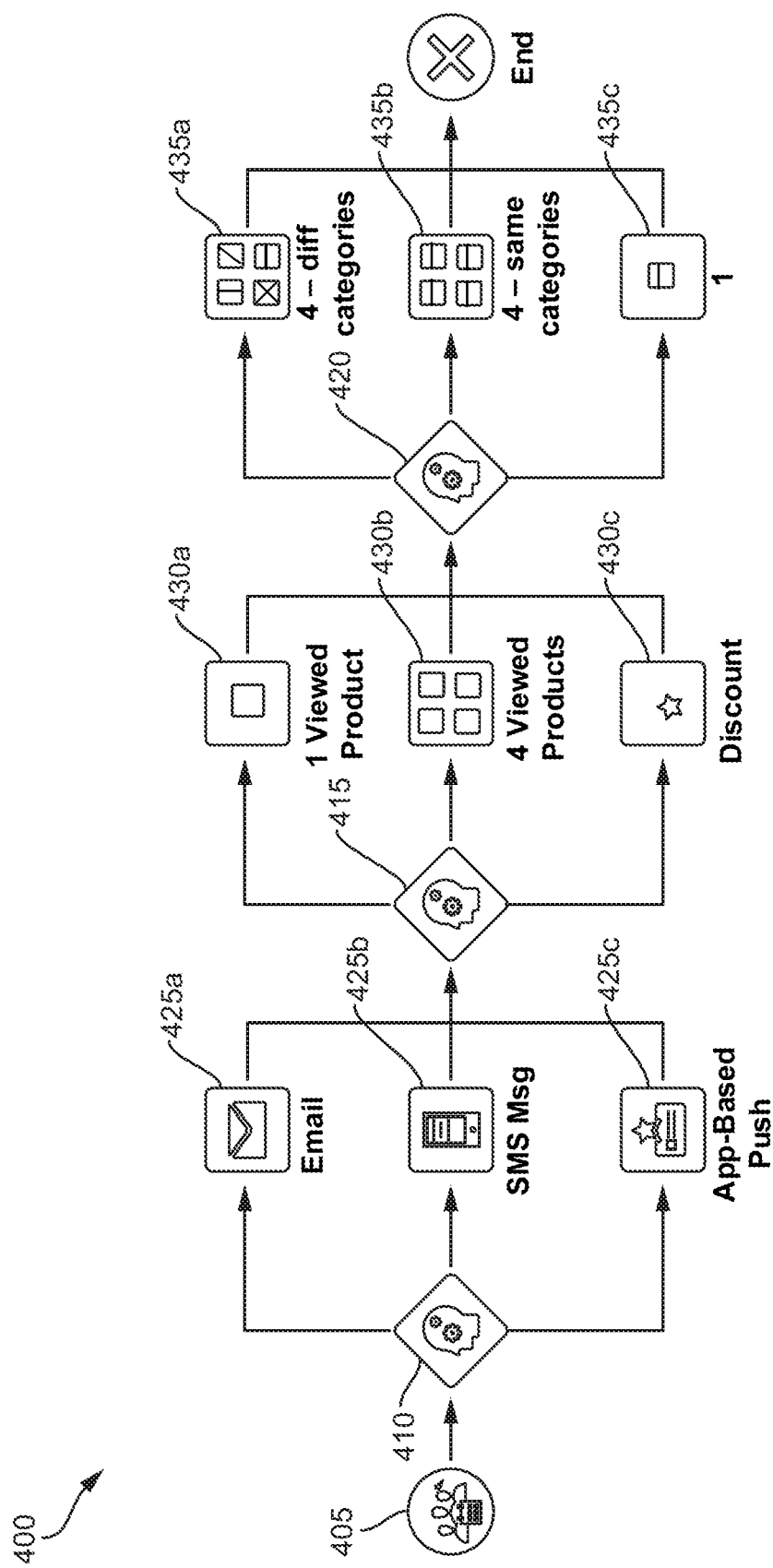
FIG. 4 shows a representation of a communication decision tree.

FIG. 4 shows a representation of a communication decision tree 400. Communication decision tree 400 includes a starting node 405, at which each trajectory begins. A particular trajectory can be (in this example) initialized upon detecting that a user has completed two particular actions (e.g., initialized two web-site sessions, purchased two items from a web site, navigated to at least two webpages on a web site, etc.).

Communication decision tree 400 includes three branching nodes 410, 415 and 420—each of which branches to connect to three nodes representing three different actions. A trajectory can automatically and immediately extend from initial node 405 to a first branching node 410, which triggers a first decision to be made. Specifically, the first decision can include identifying a communication channel to use to send an alert of a web-site feature. The alert can include an automatically presented static header that indicates (for example) that a product or discount (generally) is available in association with the web site. The alert may further be associated with dynamic content (e.g., that specifically identifies one or more products and/or a discount) that is to be identified at a second branching node 415 upon detecting a request to open the notification.

First branching node 410 is connected to a first action node 425a that represents an email communication channel, a second action node 425b that represents an SMS-message communication channel, and a third action node 425c that represents an app-based communication channel (where a notification would be pushed to and/or by an app installed at a user device).

The first decision can be made using a machine-learning model configured based upon one or more first parameters. The one or more first parameters can be dynamically determined based on anonymized and/or partially anonymized user data and/or client-specific data. For example, anonymized and/or partially anonymized user data may indicate—for each of various user sub-populations (as defined based on one or more user attributes)—how effective an alert transmission sent via each of the three types of communications channels was at triggering the user to initiate a session at a corresponding web site (e.g., as determined based on using tracking links within the alerts) and complete a transaction during the session. The anonymized and/or partially anonymized user data may correspond to many different web sites and/or web sites having one or more particular characteristics. The client-specific data can include data tracked by a given client for the particular web site of interest and can data that specifically identifies each user to which various alerts were transmitted and the result. The client-specific data may thus be richer in some respects relative to the anonymized and/or partially anonymized data, but the number of users represented in the client-specific data may be smaller than that represented in the anonymized and/or partially anonymized data. Further, the client-specific data may lack pertinent attribute combinations. For example, a given client may not have previously used app-based alerts, which may have reduced an accuracy with which a machine-learning model could predict potential effects of such alerts.

The machine-learning model (configured with the first parameters) can use profile data associated with the trajectory to determine which communication channel to user. The profile data can include client-collected profile data (e.g., using metadata, cookies and/or inputs associated with previous HTML requests from a user device associated with the trajectory). The profile data may further include other profile data requested and received from a remote user-profile data store, which may collect and manage profile data from multiple web hosts, clients, etc.

Upon identifying the communication channel, the trajectory extends to the corresponding action node (425a, 425b or 425c). An alert is then sent using the corresponding communication channel. The alert can be configured to automatically identify limited content and to cause the trajectory to extend to second branching node 410 upon detecting a request to open the alert. A decision can then be made at second branching node 410 to determine specific content to be presented in a body of the alert.

Thus, second branching node 415 is connected to a first notification content node 430a that represents content that identifies a product most recently viewed by the user at the web site, a second notification content node 430b that represents content that identifies four of the products most viewed (across users) at the web site over the last week, and a third notification content node 430c that represents content that includes an identification of a discounts. The second decision can be made using the machine-learning model configured based upon one or more second parameters. Thus, in some (but not all) instances, a general type of machine-learning model used at various branching nodes to make decisions can be the same, though particular configurations (e.g., indicating weights to be assigned to various user attributes, which user attributes are to be considered at all and/or target outcomes) can differ.

The one or more second parameters can be dynamically determined based on anonymized and/or partially anonymized user data and/or client-specific data. However, each of the anonymized and/or partially anonymized user data and/or the client-specific data may have changed since making the first decision, which can contribute to differences between the first and second parameters. Further, the potential actions considered at second branching node 415 differs from those considered at first branching node 410. Therefore, the first and second configurations can be different. Additionally, the profile data that is processed can differ between the first and second branching nodes. For example, a client-associated application may have been installed at a user device between processing performed at the first and second branching nodes (e.g., such that application-based notifications are an option at the second branching node but were not at the first).

Upon identifying the content, the trajectory extends to the corresponding content node (430a, 430b or 430c). The corresponding content is then transmitted to the user device, such that it can be presented at the user device.

The content can include one or more tracking links to a webpage at the web site. Upon detecting that a tracking link has been activated, the trajectory can extend to a third branching node 420. A decision can then be made at third branching node 415 to determine specific content to be presented at the requested webpage.

Thus, third branching node 420 is connected to a first webpage content node 435a that represents content that identifies four representative products—each associated with a different category; a second webpage content node 435b that represents content that identifies four representative products—each associated with a same category; and a third webpage content node 435c that represents content that identifies a single product predicted to be of interest to a given user based on previous webpage-interaction data.

The third decision can be made using the machine-learning model configured based upon one or more third parameters. The third parameter(s) can differ from the first parameter(s) and/or the second parameter(s) as a result of temporal changes to anonymized and/or partially anonymized user data, the client-specific data and/or as a result of differences of the potential actions. Additionally, the profile data processed at third branching node 420 can be different than that processed at first branching node 410 and/or second branching node 415 (e.g., as a result of detecting new metadata in communications from the user device and/or receiving new information corresponding to the profile from a remote system).

Upon identifying the content, the trajectory extends to the corresponding content node (435a, 435b or 435c). The corresponding content is then transmitted to the user device, such that it can be presented at the user device within a corresponding webpage.

It will be appreciated that, while communication decision tree 400 depicted in FIG. 4 shows a single decision being made at each communication stage (when a notification is to be transmitted, when a body of a notification is to be presented, and when a webpage is to be presented), multiple decisions may instead be made using a machine-learning model. For example, at branching node 410, a decision may be made as to what communication channel to use and when to transmit a notification (e.g., by identifying a time within a time period or a time from amongst a set of potential times). As another example, a separate decision may be made before or after the communications-channel decision to identify a transmission time. Thus, a machine-learning model may be configured to generate multiple outputs or multiple machine-learning models can have multiple configurations (each corresponding to different parameters and/or hyperparameters, each trained separately and/or each producing a separate type of output).

Figure 5:
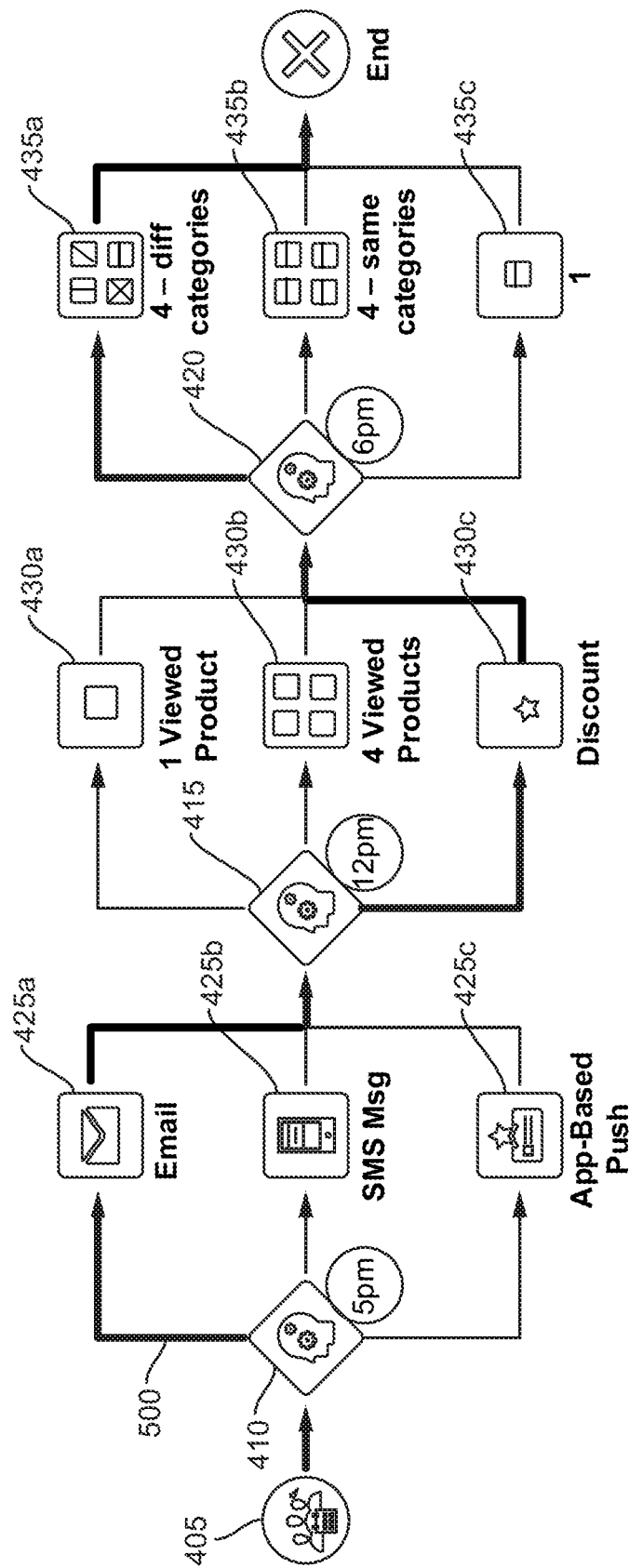
FIG. 5 illustrates an example of a trajectory corresponding to a user device and extending through a communication decision tree.

FIG. 5 illustrates an example of a trajectory 500 corresponding to a user device and extending through communication decision tree 400. In this instance, a machine-learning result made at first branching node 410 indicated that an email communication channel was to be used to send a notification, such that trajectory 500 extended to first action node 425a. An email notification is then transmitted to the user device. A request for email content is detected, indicating that a user is attempting to view the email, such that trajectory 500 extends to second branching node 415. There, a decision is made to include content that includes an identification of a discounts in the email. Thus, trajectory 500 extends to third notification content node 430c, and the corresponding content is transmitted to the user device.

A request for a webpage corresponding to a targeted link within the email is then detected, such that trajectory 500 extends to third branching node 420. A machine-learning result is generated that indicates that the webpage is to include content that identifies four representative products— each associated with a different category. Therefore, trajectory 500 extends to first email content node 435a, at which the corresponding webpage content is transmitted to the user device.

In the depicted instance, the decisions at the first branching node, the second branching node and the third branching node are indicated as having been made at 5 pm on a first day, 12 pm on a second day, and 6 pm on the second day. Corresponding actions are then immediately performed. It will be appreciated that action times may further be decided in accordance with a machine-learning model execution, client rule or other technique.

It will be further appreciated that identifying the machine-learning-based decision can include implementing one or more additional constraints and/or factors. Alternatively or additionally, the machine-learning-based decision can be further modified based on one or more additional constraints and/or factors. For example, U.S. application Ser. No. 14/798,293, filed on Jul. 13, 2015, (which is hereby incorporated by reference in its entirety for all purposes) further details additional techniques to dynamically identify communication characteristics, which may be further combined with machine-learning techniques disclosed herein.

In some embodiments, systems and methods are provided that avail a canvas to facilitate configuring a sequence of machine-learning implementations to partly define a communication exchange. More specifically, a canvas is availed that accepts positioning and connecting of individual switch visual elements with corresponding sets of communication visual elements. A communication decision tree can then be generated based on a set of positioned and connected visual elements. The canvas can be configured to accept, for each communication visual element, an identification of one or more communication specifications associated with the communication visual element. Each switch visual element can represent a machine-learning technique (to be associated with particular parameters learned through training) to be used to select a particular communication visual element from amongst a set of communication visual elements connected to the switch visual element. The canvas can be configured to accept (e.g., for each switch visual element or generally) an identification of a target outcome (e.g., representing a user-initiated event or communication), which can direct machine-learning selections. Thus, the particular communication visual element selected using the machine-learning technique can correspond to a communication specification predicted to be relatively likely to result the target outcome (e.g., which may be represented as an event visual element in the communication decision tree).

A machine-learning model can be defined for each represented switch visual element. The machine-learning model can be trained using previous trajectories pertaining to other communication decision trees (e.g., but capitalizing on the other communication decision trees having communication visual elements that correspond to similar or same communication specifications as those represented by communication visual elements in the model being trained). For example, the model can be trained by determining—for the trajectories routed so as to trigger a communication having a particular communication specification—what subsequent user-initiated events were represented by those trajectories (e.g., and what portion of the trajectories represented an occurrence of a client-identified target outcome). The model can further or alternatively be trained using trajectories as they emerge that pertain to the generated communication decision tree.

In some instances, a model can be trained using a data set that reflects previous events (e.g., trajectories through a same or different communication decision tree and/or other indication of an event sequence) and is augmented with new data. The new data may have recently become available (e.g., via newly received form input or metadata detection) but may correspond to a variable type estimated to be static or predictably changing. For example, if a user's age is identified at time X, the user's age at time X−3 years can be calculated, while an accuracy of a retrospective estimate of an interest or location variable over an extended time period may be less reliable. The training can then determine whether various attributes represented in the new data was predictive of whether particular events were going to occur.

The interface can be configured to accept indications as to biases that are to be applied at various machine-learning stages. For example, with respect to a given switch element that is connected to a particular set of communication visual elements, a client may interact with a slider control visually associated with a first visual element to indicate that path selections are to be boosted towards (or dampened from) the first visual element. Metadata that feeds into the machine-learning model can be set based on the interaction to enable effecting of a corresponding bias. In some instances, the metadata can correspond to an unlearned hyperparameter that is then used to adjust or constrain a learned parameter (e.g., weight). In some instances, the metadata be used to define a post-processing adjustment to be applied to a result generated by the machine-learning model. In some instances, a client or system implements a bias towards a given communication visual element when training data corresponding to a communication specification represented by the element is relatively low (e.g., generally and/or in association with a given communication stage).

In some instances, an interface can enable a client to define a structure of the communication decision tree and/or—for each decision node—one or more hyperparameters of a machine-learning model to be executed at the node. It will be noted that a machine-learning model can be defined based on one or more hyperparameters and one or more parameters. Each of the one or more hyperparameters includes a variable that is not learned via training of the machine-learning model, while the one or more parameters include one or more variables that are learned via training of the machine-learning model. Thus, an interface can be configured to allow a client to specify hyperparameters that indicate (for example) a number of branching nodes, actions corresponding to each branch connected to each branching node, other inter-node connections, one or more constraints to be observed during execution of individual machine-learning models, and so on.

Figure 6:
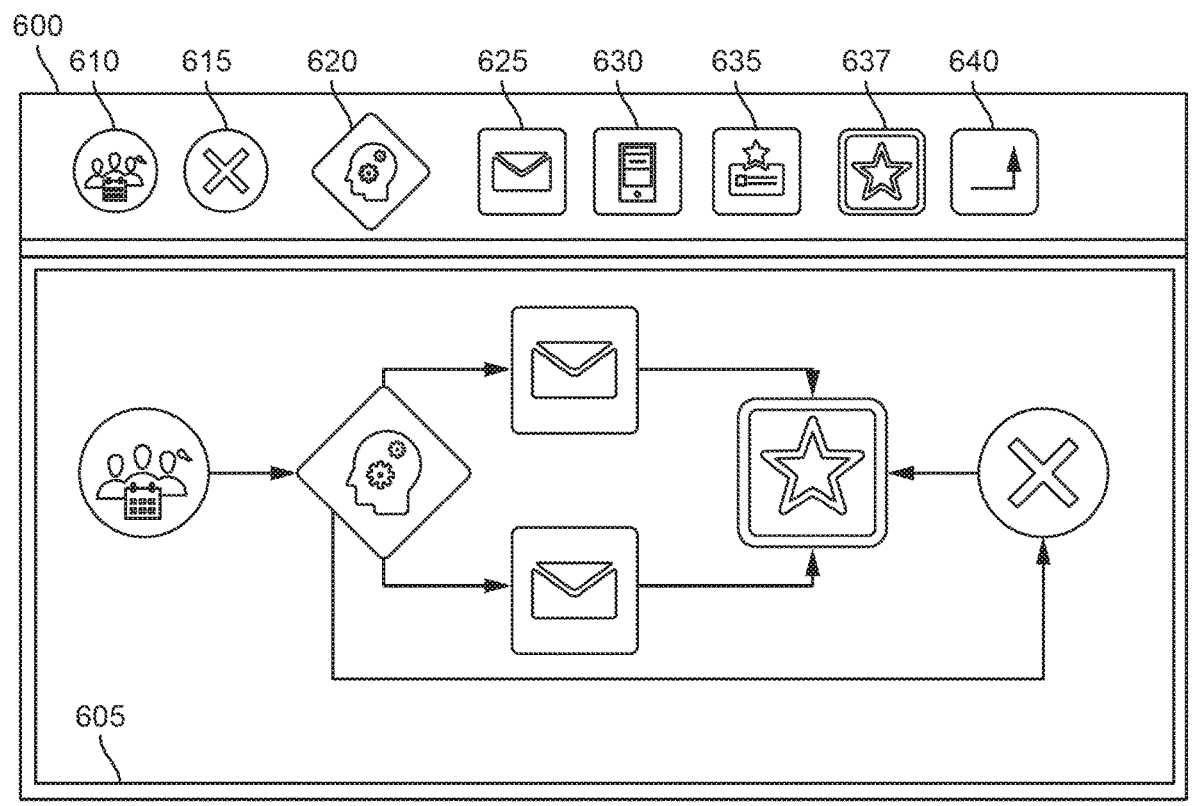
FIG. 6 shows an exemplary interface to define a communication decision tree.

FIG. 6 shows an exemplary interface 600 to define a communication decision tree. Specifically, interface includes a canvas 605 on which representations of various nodes can be positioned and connected. Interface 600 can include a set of icons that can be selected and positioned on canvas 605 to represent specific sequential operations. The set of icons can include a start icon 610 representing a start of the communication decision tree. Start icon 610 can be associated with configuration logic that can receive a definition of a condition that, when satisfied, indicates that a trajectory through the communication decision tree is to be initiated.

The set of icons can further include an end icon 615. The communication decision tree can be defined to indicate that a given trajectory is complete upon reaching end icon 615. A client can then connect action-defining icons and/or event-detection icons between a positioned start icon 610 and a positioned end icon 615 to represent various operations and assessments that are to be performed during trajectory observations.

An action-defining icon included in the set of icons can be a switch icon 620. Switch icon 620 corresponds to a branching node, at which a branch is selected or "switched to". The selection can be made using a configured machine-learning model and profile data. In many instances, switch icon 620 is connected to multiple potential paths. A potential path can intersect with another icon (e.g., a communication icon, event-detection icon, other switch icon and/or an end icon).

Exemplary communication icons include an email icon 625 indicating that an email is to be transmitted to a user device, a text-message icon 630 indicating that a text or SMS message is to be transmitted to a user device, and an app-message icon 635 indicating that an alert is to be indicated via an app installed at a user device. In some instances, a potential path indicates that no action is taken (via a lack of a communication icon). In the depicted canvas, the positioned switch icon is connected to three paths: two email paths (e.g., associated with different content and/or transmission times) and one no-action path.

An event-detection icon included in the set of icons can include target-detection icon 637, which represents that an event that corresponds to a target outcome for one or more machine-learning techniques has been detected. Target-detection icon 637 and/or another event-detection icon can indicate (for example) that a notification has been opened, a targeted link included in a notification has been activated, a user device associated with a trajectory has initiated a session with a web site, a product (e.g., any product or a specific product) has been purchased on a web site, additional profile information corresponding to the trajectory has been provided, and so on.

Interface 600 can include a connection tool 640 that can be used to connect multiple icons in a directional manner. Each connection can indicate that the communication decision tree is configured to allow a trajectory to extend across the connected node in the indicated direction. However, each connection can be associated with a condition, such that a trajectory only extends across the connection when the condition is satisfied. For example, a connection can be configured such that a condition is satisfied when a determination is made at a branching node (connected at one end of the connection) to perform an action represented by a communication icon (connected at another end of the connection). As another example, a condition may be configured to be satisfied upon detecting a particular type of interaction in association with a trajectory-associated user device.

Each action-defining icon can be associated with one or more action parameters that define a detailed action to be performed when a trajectory has reached the icon. For example, a parameter-defining interface may presented as part of interface 600 upon clicking on an icon and/or a parameter-defining interface can be opened in a pop-up window upon right-clicking on and/or double-clicking the icon.

In some instances, each action-defining icon and/or event-detection icon corresponds to a widget or piece of code that can be independently executed. Canvas 605 can serve as a communication fabric, such that a result produced by one widget (e.g., an indication from a machine-learning model corresponding to a switch icon that a communication is to be transmitted in accordance with a particular communication specification) can be availed to another widget (e.g., a widget corresponding to a communication icon corresponding to the particular communication specification). Thus, canvas 605 can extend trajectories in response to widget results and orchestrate aspects of communication exchanges.

While not shown in FIG. 6, it will be appreciated that, in some instances, multiple switch icons 620 can be positioned on canvas 605. Each switch icon 620 can correspond to a separate instance of a machine-learning model that can be separately configured and operated.

FIG. 7 shows an exemplary parameter-defining interface 700 for a switch icon. Parameter-defining interface 700 includes a field for a Stage Label that accepts text input. The text input can subsequently displayed next to the associated icon in the interface for defining the communication decision tree. A description can also be entered via text input, which can be displayed (for example) in the interface for defining the communication decision tree in response to detecting a single click or double click in association with the icon.

For switch icons that are configured to identify a selection or action specification and/or that are configured to implement a machine-learning model, parameter-defining interface 700 can include a field to define a target outcome. For example, a pull-down menu may identify a set of events that are being tracked and are available for identification as a target outcome. The target outcome can include an action initiated at a user device, a system-initiated notification, etc. For example, a target outcome can include detecting that a link within a communication availed to the user device was clicked, that a communication availed to the user device was opened, that a communication resulted in a purchase made in association with the user device (i.e., a conversion), that a chat session was initiated, that a form was completed, etc.

For switch icons that are configured to identify a selection or action specification and/or that are configured to implement a machine-learning model, parameter-defining interface 700 can further include one or more fields that indicate potential results to be identified. For example, interface 700 includes fields that correspond to three paths or branches that extend from the icon. In this instance, a stage-label name of another action-defining icon is identified for each path. In some instances, path information is automatically updated at parameter-defining interface 700 upon detecting that a switch is connected to one or more other icons at the interface for defining the communication decision tree. It will also be appreciated that parameter-defining interface 700 can include an option to add an additional path, remove a path, etc.

In some instances, one of the paths can be identified as a default path. Trajectories may then generally be routed to the default path unless (for example) a machine-learning model predicts that another path will have at least a threshold degree of greater probability of resulting in the target outcome, traversal through another path will produce additional data for the path that is of a threshold value (e.g., as indicated by a predicted improvement in confidences of subsequent predictions), etc. In some instances, whether a default path is selected depends on a confidence associated with a probability of the target outcome occurring (e.g., unless it is predicted that another path has at least a 60% probability of resulting in a target outcome and that the probability has a confidence of at least 50%).

In some instances, a switch icon can be configured to select a path and/or next action (or lack thereof) and a time to extend the path to a next icon (e.g., and perform any next action). The time can be selected from amongst multiple times and/or along an open or closed continuum. In the depicted instance, parameter-defining interface 700 includes a maximum time at which the trajectory is extended to a next action-defining icon. Thus, here, the trajectory is to be extended no later than one day after the trajectory has reached the switch icon unless decision logic executed in association with the switch icon indicates that another time period is sufficiently more advantageous (e.g., due to a higher probability of resulting in a target outcome and/or to increased training data).

A machine-learning technique and/or other selection technique can be configured to identify a path from amongst multiple potential paths that is associated with a highest probability of resulting in a target outcome. In some instances, the technique further introduces some degree of noise and/or variability such that a path deemed to be sub-optimal are occasionally selected to facilitate continue training of an underlying model.

In some instances, a client may have a reason to introduce a bias towards or against selection of a particular path. For example, a particular path may be costly (e.g., computationally and/or financially) to use relative to another path. As another example, a particular path may have high availability relative to another path. As yet another example, a client may desire to quickly gain information as to an efficacy of a given path so as to inform subsequent resource-allocation decisions.

Thus, parameter-defining interface 700 can include one or more options to effect a bias towards or against individual paths. In the depicted instance, a slider is provided for each path. When the slider is positioned towards the right "Boost" side, the path-selection technique can be adjusted to be biased towards a corresponding path. When the slider is positioned towards the left "Constrain" side, the path-selection technique can be adjusted to be biased against a corresponding path. Such boosting and/or constraining options may have imposed limits, such that (for example) an effect of moving the slider to the left-most constrain position is not to prevent a selection of a corresponding path. Such limits can allow a machine-learning model to continue to collect data pertaining to various options and continue to modify one or more parameters through learning. When there are only two options, a single interface component may be provided to identify relative bias towards one option versus the other. Meanwhile, option-specific boosting/constraining options can provide more intuitive controls when there are more than two options.

Figure 8:
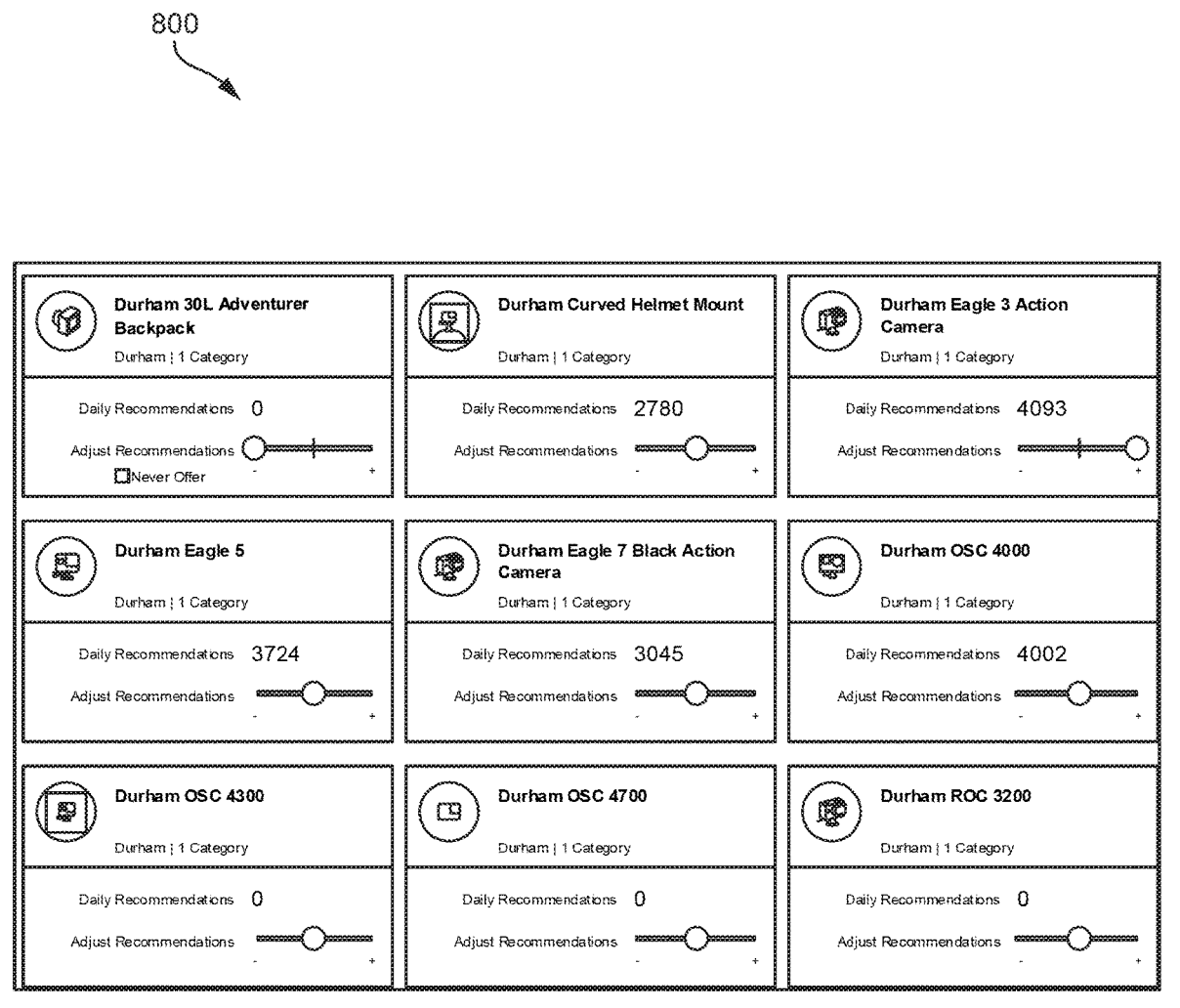

FIG. 8 shows another parameter-defining interface 800 that includes options to effect a bias towards or against representing various content in communications. In the depicted instance, nine content items (each representing a corresponding product) are represented. A slider is provided in visual association with a representation of each content item. When the slider is positioned towards the right "Boost" side, a content selection (e.g., which can correspond to selecting between multiple paths representing different content or can correspond to selecting content subsequent to identifying a communications channel) can be adjusted to be biased towards a corresponding content item. When the slider is positioned towards the left "Constrain" side, the path-selection technique can be adjusted to be biased against a corresponding item.

In the depicted instance, the slider is positioned to a left-most position. This triggers a "Never Offer" option to be presented. In some instances, if the Never Offer option is not selected, the first content item may at least occasionally still be selected.

Based on the relative biases indicated by the sliders and historical communication counts, a system can predict a number of times that individual content items will be represented in a given day. Thus, as a client moves one or more sliders, interface 800 may automatically update estimated counts as to a number of times that individual content items will be presented (e.g., per day) given the slider positions.

It will be appreciated that different types of biases can further be identified and effected. For example, one or more sliders may be provided to indicate biases related to when a communication is transmitted. For example, a slider may indicate an extent to which to bias decisions towards an immediate transmission (and/or towards transmission at another time, such as at a capped time).

Effecting a bias (e.g., towards or against a type of communication channel, towards or against representing particular types of content, towards or against transmitting a communication at a particular time, etc.) can include (for example) modifying one or more weights in a machine-learning models and/or one or more thresholds. In some instances, effecting a bias includes performing a post-processing (e.g., to redistribute a portion of the results to improve an extent to which a distribution of communication attributes matches a target distribution indicated based on the bias(es).

Figure 9:
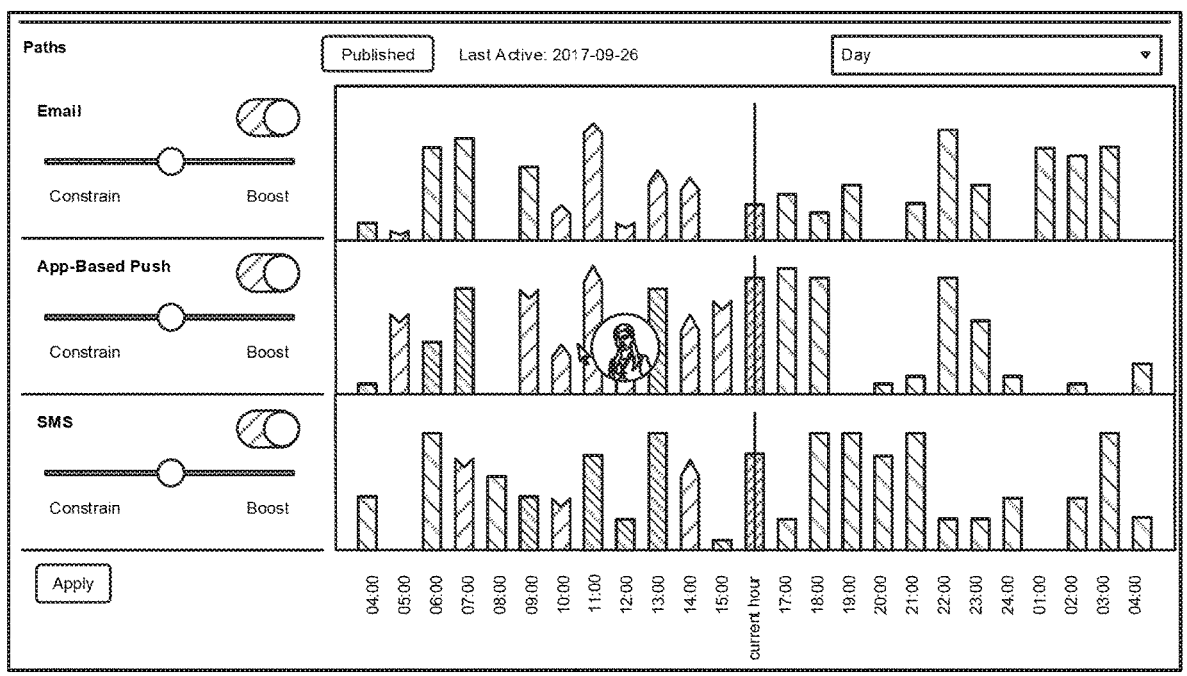
FIG. 9 shows another exemplary parameter-defining interface that includes options to effect a bias towards or against using various communication channels to transmit communications.

FIG. 9 shows yet another parameter-defining interface 900 that includes options to effect a bias towards or against using various communication channels to transmit communications. In the depicted instance, three communication channels are represented: email, app-based notification and SMS message. A slider is provided in visual association with a representation of each channel. When the slider is positioned towards the right "Boost" side, a content transmission can be adjusted to be biased towards using the corresponding type of channel. When the slider is positioned towards the left "Constrain" side, the path-selection technique can be adjusted to be biased against a corresponding channel.

Interface 900 further shows a time-series representation indicating a number of communications that have been transmitted using each channel within a recent time period and further indicating a number of communications scheduled for transmission using each channel. across an upcoming time period. A current time is represented by the vertical line. The communications can be scheduled in accordance with a selection technique that selects between multiple potential transmission times (e.g., which may be included in a same or different machine-learning model relative to one selecting a communication channel). Thus, a client can view scheduled loads across various channels and determine whether to adjust any biases set for or against a channel.

Figure 10:
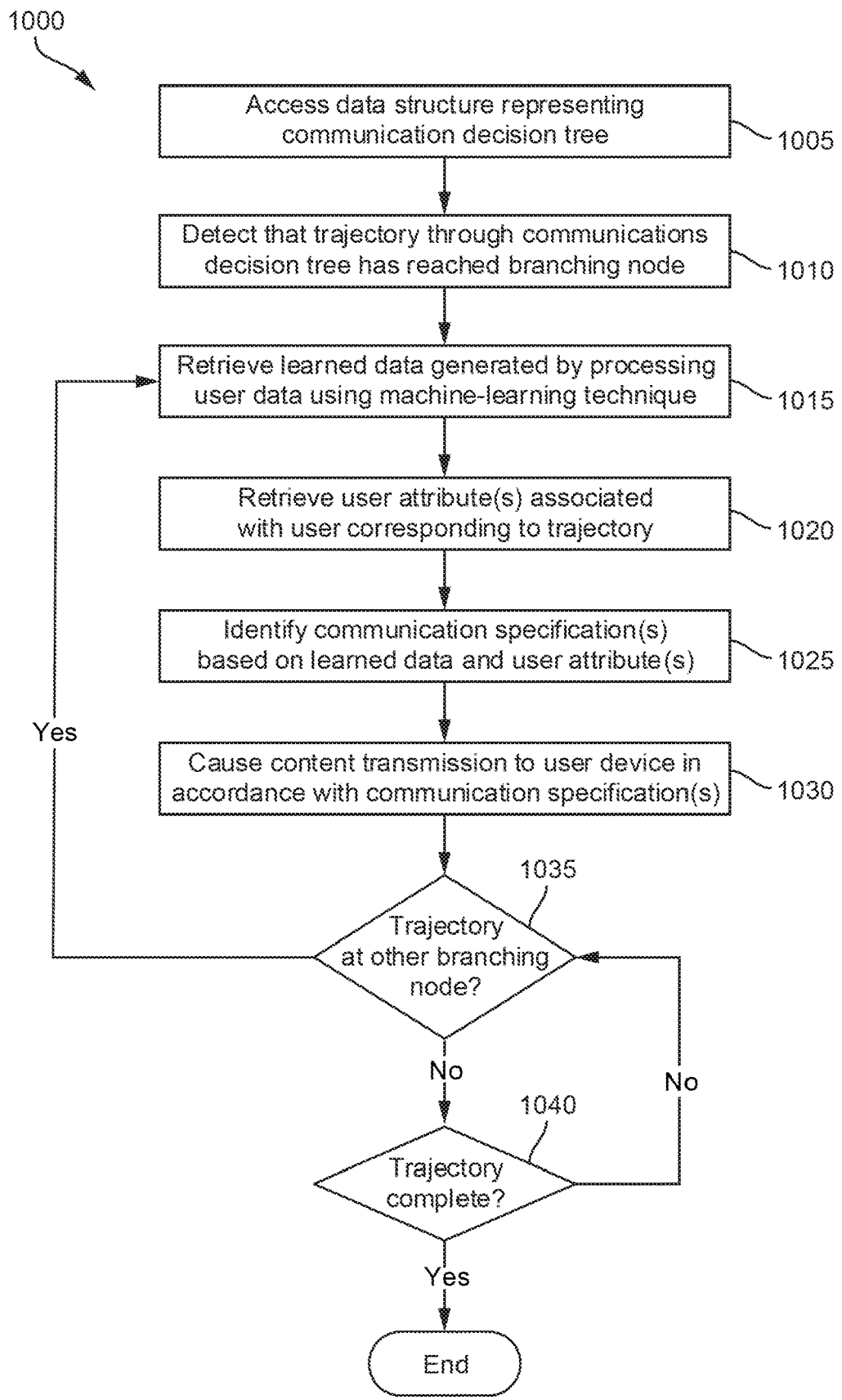
FIG. 10 shows a flowchart for a process for using machine learning to direct trajectories through a communication decision tree according to some embodiments of the invention.

FIG. 10 shows a flowchart for a process 1000 for using machine learning to direct trajectories through a communication decision tree according to some embodiments of the invention. Process 1000 begins at block 1005 where a data structure representing a communication decision tree is accessed. The communication decision tree can be configured to dynamically define individual trajectories through the communication decision tree using a machine-learning technique to indicate a series of communication specifications. More specifically, the communication decision tree can include a set of nodes. A given trajectory can be extended across nodes in response to detecting an event indicating that such extension is to occur. An event can include (for example) detecting a particular type of action or communication from a user event or can include identifying a particular decision (corresponding to a node identification) at a trajectory-managing system or machine learning data platform. The set of nodes can include a set of branching nodes. Each branching node of the set of branching nodes can correspond to an action point configured to identify a direction for a given trajectory and/or to identify a particular action to be initiated at a trajectory-managing system or machine learning data platform. A branching node can be configured to identify the direction or action using a configured machine learning model.

At block 1010, it is detected that a trajectory (associated with a particular user and/or particular user device) has extended to reach a branching node of the communication decision tree. The particular user can be one of a set of users included in a target group of communication recipients or target audience (e.g., each being associated with one or more predefined attributes identified by a client). The target group of communication recipients or target audience need not (though it may) be statically defined. For example, it can represent a dynamic set that corresponds to profiles that—at various points in time—represent each of one or more predefined attributes. The trajectory may have been extended to the branching node as a result of detecting a particular type of event initiated at the user device (e.g., a communication indicating that the user device is engaged in a session at a client-associated web site, a communication indicating that the user has completed a profile form submission, etc.) and/or as a result of completing a particular system-initiated action.

At block 1015, learned data that has been generated by processing other user data is retrieved. The other user data can correspond to data associated with at least part of the target group of communication recipients and/or target audience. The learned data can include data generated while training a machine-learning technique. It will be appreciated that the training may occur during a separate time relative to using the machine-learning technique to direct one or more trajectories, or the training and utilization of the machine-learning technique may be performed concurrently. The other user data can include trajectory data associated with one or more trajectories through a same or different communication decision tree. For example, the other user data can indicate for which of the at least part of the target group of communication recipients a corresponding trajectory reached a target node in a communication decision tree as specified in a predefined trajectory objective (e.g., indicating a success of a workflow). A target node may represent (for example) interacting with content, a conversion or responding to a communication. As another alternative or additional example, the other user data can indicate for which of the at least part of the target group a corresponding trajectory reached a preidentified node representing an undesired result (e.g., lack of responding to a communication, lack of a conversion or lack of interacting with content). The other user data can indicate profile data and/or attributes corresponding to one or more users and can further indicate various events detected and/or initiated in association with individual trajectories. Thus, for example, the other user data may indicate a probability of detecting a particular type of event (e.g., identified by a client as a target outcome) when various circumstances exist.

At block 1020, one or more user attributes associated with a user corresponding to the trajectory (detected as extending to the branching node) are retrieved. The user attribute(s) can include (for example) a type of user device; a geographical location of a user device; a type of browser being used at the user device; an operating system being used at the user device; a partial or complete history of an interaction between the user device and a particular web site; an interaction between the user device and one or more other web sites, cookie data associated with the user device; historical data indicating types of notifications (e.g., types of emails, text messages and/or app messages) that were opened at the user device, that resulted in activation of an included link, etc. The one or more particular user attributes can be collected and/or retrieved locally and/or requested and received from a remote source.

At block 1025, one or more communication specifications are identified based on the learned data and the one or more user attributes. For example, the learned data can include one or more parameters of a machine-learning model (e.g., a regression model). The machine-learning model may further be defined based on one or more hyperparameters. The machine-learning model can then be configured to process the user attribute(s) using the parameter(s), hyperparameter(s) and/or underlying structure. A result of an implementation of the model may identify a selection from amongst multiple available options that is predicted to be the most successful in achieving a target outcome. The multiple available options may correspond to (for example) different types of communication channels to be used, different types of content to be transmitted, and/or different timings of transmission. In some instances, the multiple available options share one or more other communication specifications.

At block 1030, transmission of content to a user device associated with the trajectory is triggered. The content transmission is performed in accordance with the one or more communication specifications.

At block 1035, it is determined whether the trajectory has extended to reach another branching node within the communication decision tree. The determination can include determining (for example) whether a threshold amount of time has passed since a last communication was transmitted to the particular user (or corresponding device); that the particular user interacted with a last communication transmitted to the particular user (or corresponding device) and/or that the particular user interacted with target content irrespective of whether such interaction with the target content was a result of a last communication transmitted to the particular user (or corresponding device). In some instances, each of two or more of these determinations is associated with a criterion of a different branching node.

Block 1035 can include identify which other branching node to which the trajectory has extended.

If it is determined that the trajectory has extended to reach another branching node, process 1000 returns to block 1015 and blocks 1015-1035 are repeated. However, the repeated iteration of block 1015 may include retrieving different learned data generated by processing other user data (e.g., potentially, but not necessarily, in combination with at least some of the user data). The different learned data may have been generated using a same or different configuration of the machine-learning technique (e.g., having same or different values and/or types of parameters and/or hyperparameters). The repeated iteration of block 1020 can include retrieving at least one other user attribute. The repeated iteration of block 1025 can include identifying at least one other communication specification (and/or from amongst a different set of potential communication specifications) based on the different learned data and the at least one other user attribute. The at least one other communication specification can be identified using a same or different type of underlying model. And the repeated iteration of block 1030 can include triggering another transmission of other content in accordance with the at least one other communication specification.

When it is determined that the trajectory has not extended to reach another branching node, process 1000 proceeds to block 1040 to determine whether the trajectory is complete. The determination can be made by determining whether a current end of a trajectory is associated with a trajectory that lacks an extending connection. If it is determined that the trajectory is complete, processing of the trajectory can be terminated. If it is determined that the trajectory is not complete, process 1000 can return to block 1035 to await a determination that the trajectory has reached another branching node (e.g., as a result of a user-initiated action or external event).

Thus, process 1000 facilitates repeatedly using differently configured machine-learning models to identify specifications corresponding to different stages in a communication exchange. At the different stages, the models can use different profile data (e.g., values for different fields or values that have changed in time) and/or different model parameters (e.g., learned based on different inputs and/or outputs pertaining to the models and/or based on temporal changes). This iterative application of machine-learning models facilitates dynamically directing communication exchanges for individual users.

Figure 11:
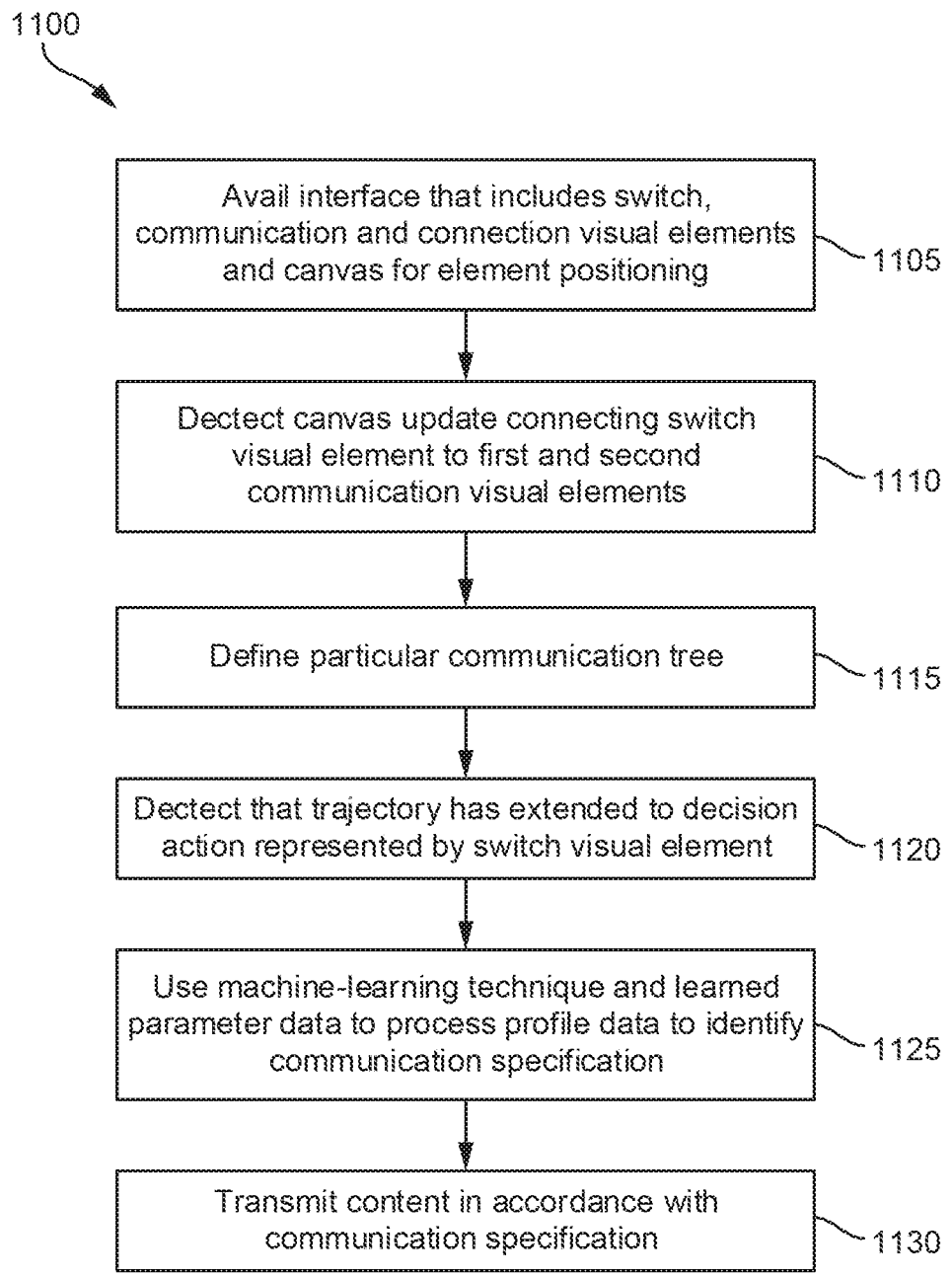
FIG. 11 shows a flowchart for a process for defining a machine-learning-based communication decision tree using an interface supporting positionable visual elements.

FIG. 11 shows a flowchart for a process 1100 for defining a machine-learning-based communication decision tree using an interface supporting positionable visual elements. Process 1100 begins at block 1105 where an interface is availed that includes a set of visual elements and a canvas for element positioning. Each of the set of visual elements can be positionable on the canvas. For example, the interface may be configured to allow a user to click on a representation of a visual element and—while maintaining the click—drag a cursor to another position on the canvas to drop the visual element at the other position. As another example, a representation can be selected (e.g., via a click or double-click) and another input (e.g., another click or double-click) received while the cursor is at another position can cause the visual element to be positioned at the other position.

The set of visual elements can include a set of action-defining visual elements. Each action-defining visual element of the set of action-defining visual elements can a particular action that is to be performed when a given trajectory has extended to the action-defining visual element. The set of action-defining visual elements can include a switch visual element that represents a decision action (e.g., made using a machine-learning model) to identify a communication specification using a machine-learning technique. The set of action-defining visual elements can further include a set of communication visual elements. Each of the set of communication visual elements can represent a particular communication specification (e.g., a type of communication channel, specific content, transmission time, etc.). The set of visual elements can also include a connection visual element configured to directionally connect multiple positioned visual elements. Each positioned visual element of the multiple positioned visual elements can correspond to an action-defining visual element of the set of action-defining visual elements. The directional connection can indicate an order in which particular actions represented by the multiple positioned visual elements are to occur.

At block 1110, an update to the canvas is detected. The updated canvas can include the switch visual element being positioned at a first position within the canvas, a first communication visual element of the set of communication visual elements positioned at a second position within the canvas, and a second communication visual element of the set of communication visual elements being positioned a third position within the canvas. The first communication visual element can represent a first particular communication specification, and the second communication visual element can represent a second particular communication specification.

The updated canvas can further include a set of connection visual elements. Each of the set of connection visual elements can include an instance of the connection visual element. A first connection of the set of connection visual elements can be positioned to connect the switch visual element to the first communication visual element. A second connection of the set of connection visual elements can be positioned to connect the switch visual element to the second communication visual element. The set of connection visual elements can indicate that potential results of execution of the machine-learning technique at the switch visual element include a first result that triggers a communication transmission having the first particular communication specification and a second result that triggers a communication transmission having the second particular communication specification.

At block 1115, a particular communication decision tree is defined based on the updated canvas. At block 1120, it is detected that a given trajectory associated with particular profile data has extended to a particular decision action represented by the switch visual element. In response to the detection, at block 1125, the machine-learning technique (configured with learned parameter data and/or static data) is used to process the particular profile data to produce a machine-learning result. The learned parameter data can include data learned during a separate or ongoing training of a machine-learning model based on a set of trajectories associated with other users and/or associated with a same or different communication decision tree. The processing of the particular profile data using the machine-learning technique can indicate which one of the first and second particular communication specifications is to be applied for a content transmission.

Thus, at block 1130, content is transmitted to a user device associated with the trajectory. The transmission is performed in accordance with the one of the first and second particular communication specifications as indicated in the machine-learning result. For example, the first and second communication visual elements may correspond to different types of communication channels. Block 1125 may then include identifying one of the two types of communication channels, and the content can be transmitted via the identified channel.

Thus, the canvas facilitates defining configurations for a communication decision tree. However, a client need not define a communication exchange that applies to all users and/or that includes merely one or more deterministic rules. Rather, the interface supports generally identifying options of various communication specifications, an order of communication events and/or constraints. Specification communication specifications can then be automatically and dynamically generated using machine-learning techniques. This approach can facilitate configuring a communication system to abide by client priorities but can allow the communication system to dynamically adapt to characteristics of particular users, resource loads, recent interaction patterns, etc.

It will be appreciated that variations of the disclosed techniques are contemplated. For example, a branching node may use another type of artificial-intelligence model that is not a machine-learning model to select a communication specification to be used for a communication. As another example, an interface may be configured to accept a selection of a particular type or a more general type of artificial-intelligence model that is to be used at a trajectory stage corresponding to a switch element. As yet another example, an interface may be configured to allow an indication of what data (e.g., in terms of corresponding to one or more communication decision trees, one or more time periods, and/or one or more user-population segments) is to be used to train a machine-learning model corresponding to one, more or all switch elements positioned on a canvas.

It will be appreciated that technology disclosed herein can be used to support various types of decision trees. For example, nodes in the tree and/or visual elements represented on a canvas can (in some instances) correspond to elements that generally are associated with logic that evaluates whether a given condition is satisfied (e.g., a particular type of inter-device communication is detected, a non-client-associated application indicates that an action was performed, a particular time has passed) and, upon detecting satisfaction, a particular action is performed. For a subset of the nodes and/or visual elements, the conditioned particular action can include executing a machine-learning model based on profile data to select from amongst a set of connected nodes (or visual elements) to proceed, such that another particular action associated with the selected node (or visual element) can be performed. For example, machine-learning-based selection of trajectory paths may be integrated into an If This Then That environment. Rather than having branching nodes connected to nodes identifying communication specifications, the branches could (for example) identify different applications to use to store data. Thus, a decision framework can be established to enable an artificial-intelligence applet and/or plugin to communicate with one or more other applets or back through a canvas.

In some instances, a technique can relate to identifying a worker to which a request to perform a particular job is to be transmitted. The technique can further or alternatively include (for example) identifying a worker to which a request to participate in a query process is to be made and/or one or more configurations for a request (e.g., to perform a particular job and/or participate in a query process).

In some instances, the identifications can be made during in correspondence with an iteration of progressing through a decision tree. The decision tree need not include finite and/or consistent potential decisions at each decision node. For example, the decision tree can include a progressive-filtering decision tree, such that a set of workers is iteratively reduced at each of two or more decision nodes. The set of potential decisions can correspond to all potential reduced subsets of workers that correspond to a given decision. A particular decision node may, but need not, constrain or define a quantity of workers that are to be included in a reduced subset of workers (e.g., indicating that a set is to be reduced to a subset including 5 workers, to be reduced by 80%, or to be reduced to include between 2 and 9 workers). A final output of the decision tree can include (for example) an identification of a single worker, a defined quantity of workers and/or may not be numerically constrained.

The decision tree may include one or more chance nodes that can reflect (for example) a response received from one or more workers. For example, following performance of a decision node, a request may be transmitted to a worker, and the response (or lack thereof) may indicate whether the worker accepted the request. In some instances, if the worker declines and/or does not accept the request (e.g., within a predetermined duration), the worker is filtered out of a current pool of workers being considered.

In some instances, the decision tree represents decisions corresponding to a job offer (e.g., an offer to accept employment corresponding to a particular position and/or occupation and/or for a particular employer). The job offer can pertain to one or more documents, files or data sets that describe the job, ideal candidates, decision timelines, salary, location, etc. Each worker can include an identifier that corresponds to person who has submitted a resume and/or application to apply for one or more particular jobs, one or more specified types of jobs and/or jobs generally. One or more first decision nodes may pertain to a decision as to which worker(s) are to be invited to a query process (e.g., in-person, telephonic or webex interview) with an employer, recruiter, etc. One or more second decision nodes may pertain to a decision as to which worker(s) a job offer (e.g., request to perform a job) is to be provided. One or more third decision nodes may pertain to identifying request configurations to perform a job (e.g., salary, vacation, location, and/or other job-offer details). As on particular example, a first decision node can be configured to output a ranking across a set of workers that corresponds to a probability of being offered an interview for a job, and a second decision node can be configured to output a ranking across the set of workers (or subset thereof) that corresponds to a probability of being offered a job. As another particular example, a first decision node can be configured to generate an output that corresponds to a likelihood that a worker will accept a job offer (e.g., versus not accepting the offer despite any possible offer configurations), and a second decision node can be configured what package (e.g., defining salary, bonus and/or compensation details) would be needed to attract the worker. Decision-node outputs can be presented or transmitted concurrently or simultaneously or at separate times.

It will be appreciated that, with respect to progression of a given trajectory, a decision can, but need not, be automatically made at each decision node. For example, rather than filtering a set of workers (or subset thereof) to a reduced set, an automated processing (e.g., that relies on execution of a machine-learning model) can output a ranking of the workers and/or a score for each worker. The output(s) can be presented and/or transmitted (e.g., to a user device) to facilitate a decision to be made by the user that indicates filtering and/or selection that is to actually occur. The filtering and/or selection can be communicated (e.g., via user input provided at a portal interface) to further adjust the decision-tree trajectory.

The filtering, ranking and/or score may be based on one or more optimization variables, which may be consistently used across multiple or all decisions in the decision tree or may be specifically defined for each decision node (e.g., and different across some or all of the decision nodes). An optimization variable may pertain to a decision made by a worker (e.g., a probability that a worker will accept a request to participate in a query process and/or a probability that a worker will accept request to perform a job), a decision made as to a subsequent request (e.g., a probability that a request to participate in a query process will be sent and/or a probability that a request to perform a job will be sent) and/or a performance (e.g., a probability that a worker will continue to perform a job over a predefined time interval, a probability of achieving a high third-party evaluation of the worker's performance, and/or a probability of securing a high stock award or bonus based on job performance).

In some instances, ranking of workers (e.g., a filtered subset of an initial set of workers) is performed based on performance data. For example, a machine-learning model can be trained based on training data that includes worker attributes and performance data. Thus, attributes from each of multiple workers (e.g., represented in a filtered subset of an initial set of workers) and job data can be input into the model, and an output can indicate rankings of the multiple workers based on predicted performance assessments of each of the multiple workers (e.g., the predicted performance corresponding to a predicted assessment of performance should the worker be assigned to the job). The output(s) can include (for example) numeric rankings (e.g., assigning a number to each worker), ordering (e.g., that includes an ordered identification of the workers), numeric or categorical scores for each worker (e.g., that enable the workers to be ordered based on the scores), etc. Training the model can result in (for example) learning one or more weights that associate various worker attributes with performance predictions. In some instances, the model is trained such that performance predictions are conditioned based on job specifications in addition to worker attributes.

Performance data used to train the model can include (for example) numeric, categorical and/or text data. In some instances, performance data can include and/or can be processed to produce a metric along a scale. Performance data can be received from one/or more job owners (e.g., employers or reviewers) at one or more times (e.g., at regular times such as annually, in response to a pull request, or as a pushed report). The training data can include attributes associated with the worker at (or approximately at) a time at which the job for which performance is being assessed was assigned to the worker and/or current attributes of the worker (e.g., current in terms of a time at which the performance assessment was made). The attributes for a given time can be ascertained based on a specification data set available for the worker at that time. In some instances, a stored specification data set can be updated based on a passage of time to derive the attributes to use for training. For example, if a specification data set included a years-experience attribute and the attribute was initially stored or last updated at time t minus x, the attribute may be updated to add x to the attribute (e.g., if it is assumed that the worker was performing a relevant job during the x time). In some instances, performance data is only included in a training data set if (for example) one or more associated worker attributes has been updated within a predefined time period.

Figure 12:
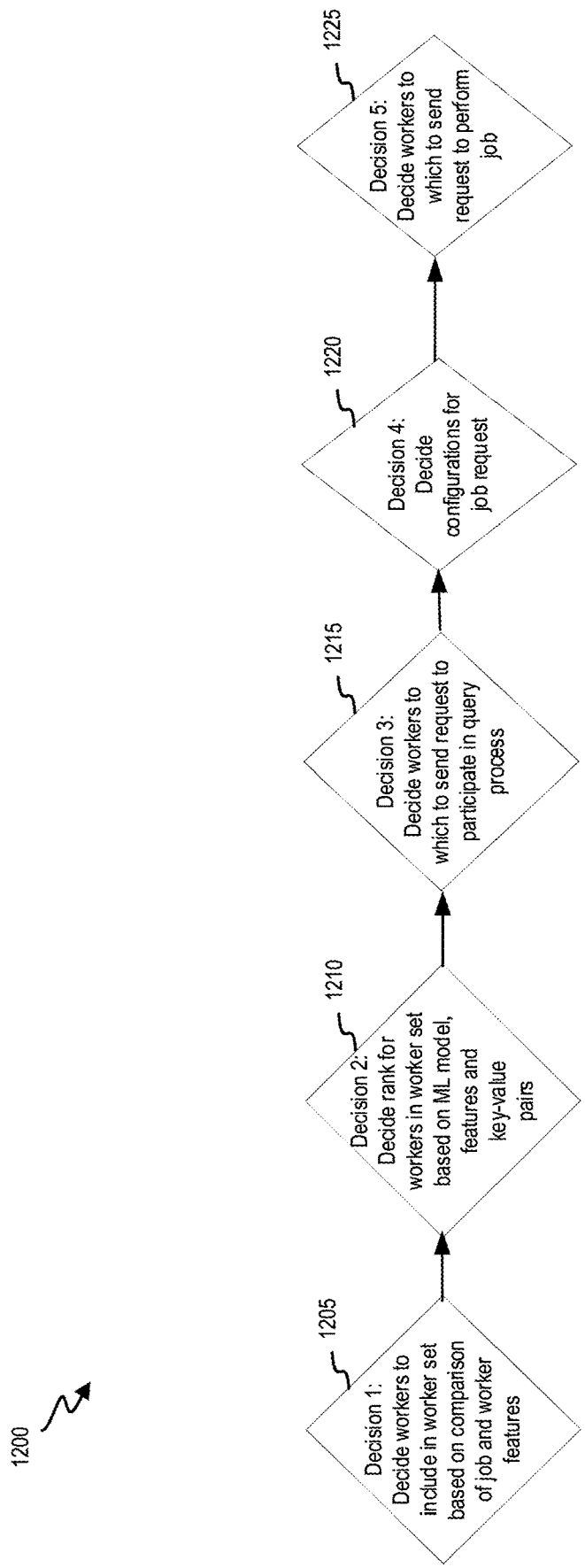
FIG. 12 shows an exemplary progressive-filtering decision tree according to some embodiments of the invention.

FIG. 12 shows an exemplary progressive-filtering decision tree 1200 according to some embodiments of the invention. The decision tree can evaluate a set of workers in relation to a particular job. In some instances, the evaluation includes evaluating a set of worker files (each representing and/or corresponding to a particular worker) and/or a job file (e.g., representing a job and/or job offer). A worker file can represent and/or include a worker specification data structure (e.g., resume data). A job file can represent and/or include a job specification data structure (e.g., job-posting data).

At decision node 1205, a determination is made as to which workers to include in a set of workers. The determination can be made based on evaluation of a set of files or data representations that correspond to a set of workers and a file or data representation that corresponds to a job. Specifically, each file or data representation (corresponding to a worker or job) can be processed and transformed into a feature data set. For example, a feature data set can include an array, matrix or vector that includes a value at each element. The value can represent an extent to which the corresponding file or data representation matches, identifies or otherwise corresponds to a given feature.

In some instances, each feature is defined as being a particular space within a word space. As a simple example, a feature may represent a cluster of words (e.g., which can include synonyms and/or other corresponding words), and a weight may (but need not) be assigned to each word. As another example, a feature may represent a distribution. Words may be positioned across a multi-dimensional word space based on (for example) their semantic similarity to other words and/or their probability of occurring within a same document, file, paragraph, field value and/or sentence as each of one or more other words. The distribution can be defined (for example) by a center or centroid and a weight (and/or skew) for each of one, more or all of the dimensions.

A feature data set can be generated using data from a specification data structure, which can include unstructured data (e.g., a set of words on variable length in terms of character or word counts). The data can be processed to identify distinct words, which can be further processed. For example, the further processing can include converting each word into a stem word (e.g., that removes endings such as "ing", "ed", etc.). Further, various words (e.g., stop words articles, prepositions, conjunctions, and so on) can be removed from the set of words.

The (e.g., processed) word set can be input into a machine-learning model or other artificial-intelligence model to identify a feature data set. As one example, the feature data set can be calculated using a machine-learning model that includes a neural network language model. In some instances, relative ordering of words in a corresponding worker specification data structure influences feature assignment. Exemplary types of machine-learning models include those identified in Le, Quoc. "Distributed Representations of Sentences and Documents" *Proceedings of the 31st International Conference on Machine Learning*, Beijing, China, 2014. JMLR: W&CP volume 32, available at: https://cs.stanford.edu/~quocle/paragraph_vector.pdf, which is hereby incorporated by reference in its entirety for all purposes. For example, doc2vec can be used to transform a text input that includes a set of words into a feature data set.

As another example, a value for a feature can be calculated by (for example) generating a weight for each word in the processed set of words based on the particular space for the feature and averaging the weights. As yet another example, a value for a feature can be calculated by counting a number of occurrences of any of a feature-associated group of words within the data from the specification data structure (e.g., and normalizing the count based on other counts or a total number of words in the data).

Individual feature data sets (e.g., for individual workers or individual jobs) can be stored. Each feature data set can be stored in association with an identifier of a worker or job and/or other information (e.g., one or more key-value pairs from a corresponding specification data structure, other information from a corresponding specification data structure, raw data from a corresponding specification data structure). The feature data set(s) and associated information can, in some instances, be stored in a Solr database.

Determining which workers to include in the set of workers can include comparing each worker's feature data set (e.g., included in a plurality of workers) to the job's feature data set (e.g., and selecting a subset of the plurality of workers based on the comparison). The plurality of workers can include (for example) workers that are identified as being available for potentially accepting a job (e.g., via a submission of a specification data structure). The plurality of workers can be dynamic, in that workers can be dynamically removed from the plurality (e.g., in response to having assigned a job to the worker or receiving requests for removal) and/or can be dynamically added to the plurality (e.g., in response to receiving new worker specification data structures).

Performing a comparison between a worker's feature data set and a job's feature data set can include generating a comparison metric based on the feature data sets. The metric can include (for example) an angle, a dot product, a correlation coefficient, etc. The worker subset can be defined as corresponding to each worker associated with a dot product or correlation coefficient (or other comparison metric) that exceeds an absolute or relative threshold. The relative threshold can be configured to identify a subset that includes a particular number or particular percentage of workers.

At decision node 1210, the set of workers are ranked via an iteration of a machine-learning model, the feature data sets and additional information. That is the machine-learning model can be executed to process input that corresponds to and/or includes the worker feature data sets, the job feature data set and the additional information. The additional information can include one or more key-value pairs from the worker specification data sets (e.g., representing or indicating years of experience, education level, etc.). In some instances, the additional information (further or alternatively) includes one or more key-value pairs from the job specification data set.

Thus, in some instances, a machine-learning model used at an earlier stage does not receive and/or process some of the worker data that is received and/or processed by a machine-learning model at a later stage. For example, one or more key-value pairs for various workers may be received and/or processed by a later-stage machine-learning model but not an earlier-stage machine-learning mode. The converse may also be true. For example, an earlier-stage machine may receive and/or process raw text, whereas a later-stage machine-learning model may receive and/or processed a processed version of the raw text and not the raw text itself.

Using different types of machine-learning models, different types of inputs and/or different optimization variables across different stages of a decision-tree iteration can provide technical advantages. In some instances, using different types of inputs facilitates efficient processing. For example, using processed versions of worker data at later stages in lieu of original data can make use of previous data processing and learning that can be performed to emphasize or select useful (or potentially useful) information rather than repeating processing. Further, because earlier stage processing can (but need not) learn from a bigger and/or more diverse data set, learned dimensionality-reduction processing may be more robust when relying on earlier-stage learning relative to later-stage learning.

In some instances, using some data selectively in later stages can provide a balance of utilizing rich worker data sets while also promoting efficient processing and resource consumption. For example, a large worker population may be associated with tens of thousands or millions of key-value pairs. As each additional category of key-value pair is considered, the volume of a space of potential worker attributes exponentially increases. Meanwhile, the size of a potential worker pool can decrease across stages, such that an absolute impact of including one or more key-value pairs at a later stage is smaller than that at an earlier stage. That is, in some instances, earlier-stage calculations may be designed to be relatively simple as compared to later-stage calculations to improve efficiency and the practical possibility of performing these steps by a computer.

The machine-learning model can include a model configured to output a ranking of various inputs (given a reference job specification data structure of job feature data set). For example, the machine-learning model can use a learning to rank algorithm.

The machine-learning model can be implemented to use supervised, semi-supervised or reinforcement learning. As one example, the machine-learning model can use LambdaRank (e.g., using xgboost implementation). The machine-learning model can be trained using communications corresponding to representations of extents to which various worker data (e.g., worker specification data structures) corresponded to various job data (e.g., job specification data structures). It will be appreciated that other types of machine-learning models may be used that do not output ranks of individual workers. For example, a machine-learning model may be configured to generate an output that indicates, for each of some or all of the set of workers, a match score that represents a degree of match between worker data (e.g., a worker feature data set and/or worker-associated additional information) and job data (e.g., the job feature data set and/or job-associated additional information).

In some instances, the output of execution of the machine-learning model can be further processed. For example, post-processing can include identifying a subset of workers associated with a rank below a predetermined rank threshold and/or to identifying a subset of workers associated with a match score above a predetermined score threshold.

At decision node 1215, a subset of the set of workers are identified. The identification can include filtering the set of workers, based on the ranks (or other results) from decision node 1210, to identify workers to which a request to participate in a query process is to be sent.

In some instances, the identification is performed automatically. For example, a rule may indicate that a predetermined number of the set having the lowest (best) rankings are to be included in the subset or that each worker associated with a score that exceeds a predefined threshold is to be included in the subset.

In some instances, the identification is performed based on receipt of a communication that corresponds to an identification of workers to be included in the subset. The communication may have been generated based on and in response to input received at a user device (e.g., a recruiter's device). For example, upon having identified the rankings at node 1210, a communication may be generated that indicates the rankings in association with corresponding workers. The communication may be configured to cause an interface to be updated and/or generated and also to be presented at a user device, where the interface includes some or all of the rankings. The interface may further include and/or avail information about the ranked workers. For example, the interface may include, in spatial association with each ranking, a link to view a file or screen displaying a worker's specification data set. The interface can include one or more input options (e.g., checkbox(es), pull-down menu(s), link(s), drag-and-drop interface(s), radio button(s), etc.). Interaction with the option(s) can be automatically detected and translated into identifications of particular workers to include in the subset.

As one illustration, an interface may include a table, with each row representing a different worker. One column can indicate a rank of a worker, and other columns can include other information about the worker (e.g., field-value pairs, worker identifiers, etc.). A dividing element (e.g., thick line, which may also be movable) may be used to indicate workers to be included in the subset (e.g., as only those above the dividing element), and the interface can accept dragging-and-dropping elements to move and reorder the rows. As another illustration, an interface can include visual objects (e.g., small boxes) that identify worker-specific information and a rank of the worker. Each visual object can include or can be spatially associated with a checkbox. A checked checkbox can indicate that the worker is to be included in the subset.

In some instances, a request to participate in the query process is automatically sent (e.g., emailed or indicated in a worker's portal to a job-assignment system) to each worker in the subset. In some instances, an identification of the workers in the subset (e.g., alongside key-value information that identifies contact information for workers in the subset, such as email addresses or phone numbers) is displayed or transmitted to facilitate external communication of the request to participate in the query process. The request can include (for example) job information (e.g., position and employer), a location associated with the query process (e.g., street address), and a time (or time options) for the query process.

In some instances, responses to the requests are tracked. For example, when a request is sent as an email or via a worker's portal, one or more response options can be provided to indicate whether the worker accepts the request and/or whether the worker declines the request. As another example, a communication can be received from a user that indicates the response associated with each worker in the subset. In some instances, determining that no response has been received from a given worker within a predefined time period (e.g., beginning at a time that the request was sent) can result in generation of a virtual response that the request was declined. The subset can be further filtered to remove identification of the worker(s) that declined the request.

In some instances, decision node 1210 is not included in decision tree 1200. The identification of workers to include in the subset can be performed using an iteration of a machine-learning model. The machine-learning model may process worker specification data structures (e.g., corresponding to the set of workers), the job specification data structure and additional information (e.g., key-value pairs associated with the set of workers and/or key-value pairs associated with the job). The machine-learning model may be configured to (for example) output a ranking, score or binary identifier (corresponding to whether to include in the subset).

At decision node 1220, one or more job configurations are identified for a job request, and at decision node 1225, a decision is made as to which worker(s) to send a request to perform the job. In various instances, decisions made at nodes 1220 and 1225 are made concurrently; a decision at node 1220 is made before a decision at node 1225 is made; or a decision at node 1220 is made after a decision at node 1225 is made. In some instances, one or both of decisions made at block 1220 and at block 1225 are made using a machine-learning model.

With regard to block 1220, a machine-learning model is configured to output—for each of one, some or all of the subset of workers—one or more job configurations predicted to be sufficient (and/or a minimum) to result in a worker accepting a job (with the configuration(s)). The model may further be configured to output—when appropriate—a result that indicates that it is predicted that a worker will not accept the job regardless of the configuration(s).

With regard to block 1225, a (same or different) machine-learning model is configured to generate an output related to a selection of one or more workers to which to request performance of the job. The output can include (for example and as one or more output values) a ranking, score and/or estimate that pertains to likelihood that an offer will be accepted, predicted job-performance value and/or predicted retention probability or duration. An identification as to which worker(s) to send a request to perform a job can be automatically made and/or made based on communications reflecting identifications generated by a remote system and/or user. For example, various data (e.g., rankings, scores, minimum-specification data) can be presented on an interface that accepts selection of one or more workers of the subset of workers to which a request is to be availed. Each request may be (but need not be) configured with corresponding configuration information identified in block 1220. In some instances, the request(s) are configured with default (or consistent, such as minimum or maximum) configurations.

Thus, decision tree 1200 provides an illustration as to how multiple decision nodes can be used to iteratively refine a pool of workers for job assignment. In some instances, responses to the job requests are tracked (e.g., as described above with respect to potential techniques for tracking responses to requests to participate in a job query process). If one, more or all job requests are declined (e.g., and/or not accepted within a default time period), one or both of decisions associated with blocks 1215, 1220 and 1225 can be repeated, but while eliminating the previously selected worker(s) from the worker(s) in consideration.

Figure 13:
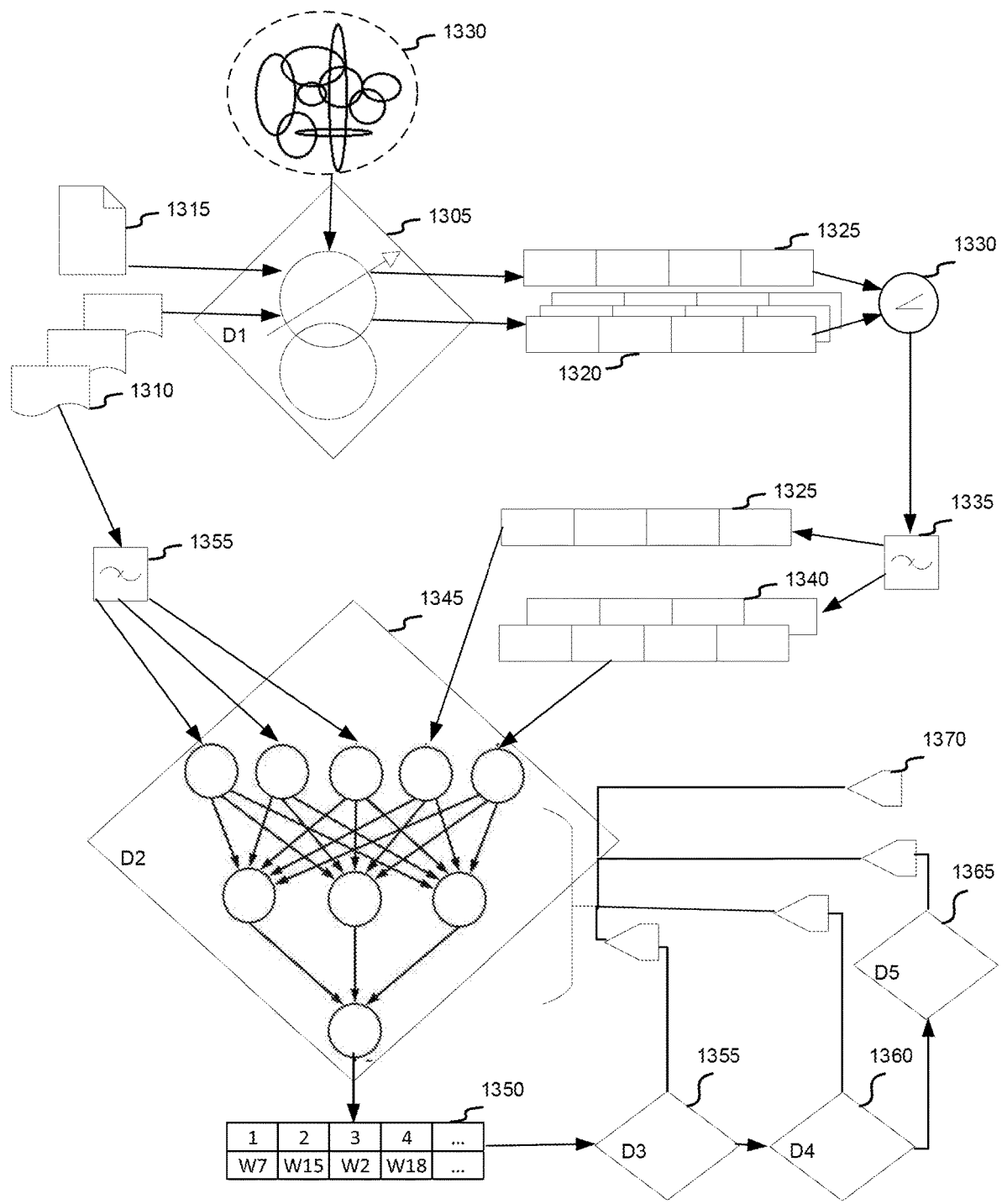
FIG. 13 shows an exemplary representation of data processing occurring during implementation of a progressive-filtering decision tree according to some embodiments of the invention.

FIG. 13 shows an exemplary representation of data processing occurring during implementation of a progressive-filtering decision tree according to some embodiments of the invention.

In the illustrated instance, at a first decision node, a transformer 1305 (e.g., a code block configured to transform one or more input data objects into a processed version thereof) receives a set of worker files 1310 and one or more job files 1315. Each worker file 1310 can include a worker specification data structure that includes a set of worker specifications, and each job file 1315 can include job specification data structure that includes a set of job specifications. It will be appreciated that, in some instances, transformer 1305 need not receive worker filers and/or job files but may instead identify worker specification data and/or job specification data to be transformed. For example, specification data may be received in one or more communications that were generated and transmitted from individual worker devices and/or other devices in response to detecting input (e.g., corresponding to online form entry).

Transformer 1305 can be configured to transform each worker file 1310 into a worker feature data set 1320 and each job file 1315 into a job feature data set 1325. Each worker feature data set 1320 and job feature data set 1325 can include—for each of a set of features—a value that indicates an extent to which the feature is represented in the corresponding (job or worker) file. Each feature can correspond to a portion of a semantic space 1330. In some instances, a machine-learning model can use a training data set (e.g., that includes unstructured data) to define each feature. The machine-learning model can be trained via unsupervised learning and can include (for example) doc2vec. Features may be defined based on co-occurrence of words and/or phrases and based on structure analysis (e.g., detecting word groupings, sentences and/or paragraphs). In some instances, an optimization variable used during training (to identify the feature set) can include an orthogonality metric between the features. That is, the feature set may be defined so as to maximize a degree to which each individual feature is orthogonal with and/or independent from each other feature.

A comparison element 1335 can compare each worker feature data set 1320 to each job feature data set 1325 to generate a comparison output for each pair-wise combination. In some instances, the comparison output includes a cosine angle between the feature data sets. In some instances, the comparison includes generating a correlation coefficient between the feature data sets, generating a difference metric (e.g., averaged, median, maximum or minimum) based on per-feature differences between the sets, and so on.

A first filter 1335 can process the comparison outputs to identify—for each job feature data set 1325—a subset 1340 of the set of worker feature data sets 1320. For example, the processing can including identifying a predefined number of workers from amongst the set of workers based on the comparison outputs generated for the set of workers. To illustrate, the filtering can include selecting 100 worker feature data sets that correspond to 100 highest comparison outputs (where a high value indicates a strong similarity, though alternative, 100 lowest comparison outputs may be identified when comparison outputs are configured such that a low value indicates a strong similarity). In some instances, the filtering includes selecting each worker feature data set that is associated with a comparison output that is above (or in alternative configurations of the output, below) a predefined threshold.

At a second decision node, a machine-learning model 1345 can further process subset 1340 of the set of worker feature data sets 1320 and an individual job feature data set 1325. Machine-learning model 1345 can be configured to be trained via supervised learning. Machine-learning model 1345 can be configured to process structured data (e.g., of a preidentified format and/or size). Machine-learning model 1345 can be configured to output—for each of subset 1340 of the set of worker feature data sets—a value (e.g., rank or score) that indicates a correspondence to the job associated with job feature data set 1325. Thus, an output can include—for each worker of one, some or all of subset 1340—a ranking 1350 or the worker. The machine-learning model can include a learning-to-rank model. In some instances, machine-learning model 1345 is trained based on an optimization variable that corresponds to input received from a user. The input may identify previous decisions (e.g., identifying whether—with respect to one or more particular workers—an interview was offered and/or accepted, a job was offered and/or accepted and/or identifying an evaluation of a job performance).

In addition to the feature data sets, machine-learning model 1345 may further process data from worker files 1310 corresponding to subset 1340 and/or job file 1315 corresponding to job feature data set 1325. The other data may include (for example) key-value data and/or individual form entries and may be identified via implementation of a second filter 1355. In some instances, the other data for a given worker (or job) can be aggregated with (e.g., concatenated with) a corresponding worker feature data set 1340 (or job feature data set 1325), and the concatenated data can be input to the model.

Rankings 1350 may be processed at a third decision node 1355, which can (for example) further filter and reduce subset 1340 of the set of workers (e.g., to a predefined size). In some instances, the further filtering includes identifying a predefined number of workers associated with the lowest rank values. In some instances, other information (e.g., feature data sets, key-value pairs, etc.) can further be considered. In some instances, the rankings are presented to a user, and the further filtering corresponds to a selection of one or more workers as indicated via one or more communications from the user device. In some instances, the further filtering is performed by a machine-learning model (e.g., that uses past worker selection to request query-process participation, past worker acceptance of participating in a query process, past worker selection for job performance, past worker acceptance of a job and/or past successful job performance as an optimization variable). The further filtered subset of workers may include (for example) workers to which a request to participate in a query process is to be communicated. If such a request is declined or not answer, third decision node 1355 may be configured to identify another worker to include in the further filtered subset.

At a fourth decision node 1360, results from the query process can be assessed to even further filter the worker subset (e.g., to identify a predefined quantity of workers for a job, such as a single worker). The decision can be made using a machine-learning model (e.g., that uses past worker selection for job performance, past worker acceptance of a job and/or past successful job performance as an optimization variable). The even further filtered subset of workers may include (for example) workers to which a request to perform the job is to be communicated. If such a request is declined or not answer, fourth decision node 1355 may be configured to identify another worker to include in the even further filtered subset.

At a fifth decision node 1365, job specification information can be determined at a per-worker basis. For example, with respect to each of one or more workers, one or more job specifications can be identified that correspond to a predicted lower threshold or value predicted to be sufficient for the worker to accept the job. In some instances, decision nodes 1360 and 1365 are merged. For example, threshold specification data can be identified for each worker and communicated to a user device, which may respond with a selection of worker(s) to be included in the even further filtered subset.

Each decision made at third, fourth and fifth decision nodes 1355, 1360 and 1365 can be fed back to machine-learning model 1345. Additional feedback 1370 can indicate (for example) whether an individual worker accepted a request to participate in a query process and/or accepted a request to perform a job and/or an indication of a quality of performance of a job associated with a worker.

Figure 14:
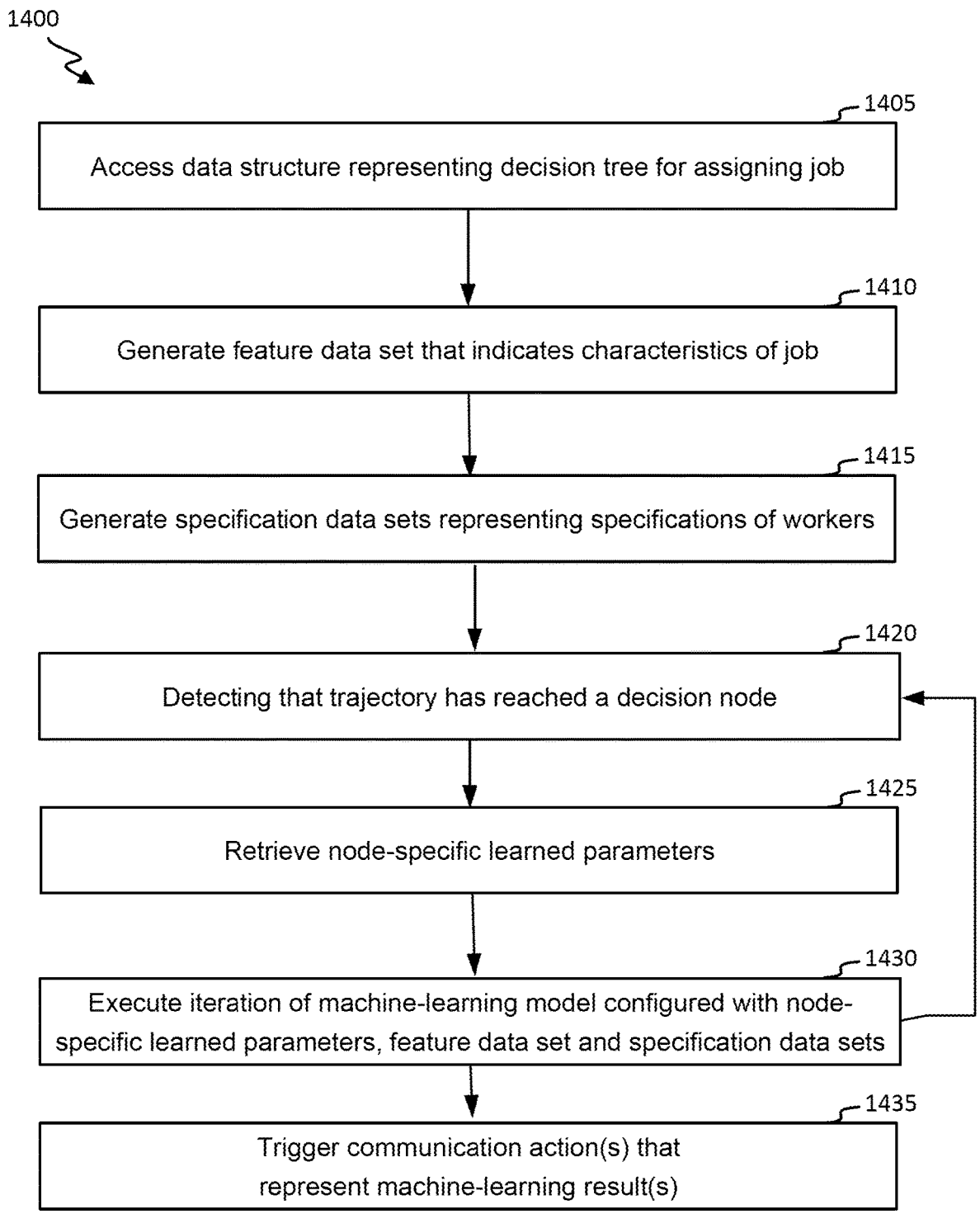
FIG. 14 shows a flowchart of a process for advancing trajectories through decision trees using machine-learning model iterations according to some embodiments of the invention.

FIG. 14 shows a flowchart of a process 1400 for advancing trajectories through decision trees using machine-learning model iterations according to some embodiments of the invention.

Process 1400 begins at block 1405 where a data structure (e.g., data file or data set) representing a decision tree for assigning a job is accessed. One or more first decision nodes of the decision tree can correspond to decisions as to how unstructured data in worker information and/or job information is to be processed to convert it into meaningful structured data. The conversion can be performed using an unsupervised machine-learning model trained to detect (for example) various relationships and structures amongst words and to then define a set of features to use for subsequently characterizing unstructured (e.g., text) data.

Using the machine-learning model, at block 1410, a job feature data set is generated. The job feature data set can include a set of numeric values that indicates characteristics of the job (via indication of an extent to which various features are identified as being represented in job information). The job feature data set can be generated via processing (for example) job information (e.g., job-offer data) received via an online portal.

Using the machine-learning model, at block 1415, for each of a set of workers, a worker specification data set is generated. The worker feature data set can include a set of numeric values that indicates characteristics of the worker. The worker feature data set can be generated via processing (for example) worker information (e.g., resume data) received via an online portal. The job feature data set can be generated by performing a semantic analysis of the worker information.

Generating specification data sets (for individual workers and/or for a job) can be performed at a single decision node or worker and job specification data sets can be generated at separate decision nodes (e.g., and potentially relying upon different learned parameters).

At block 1420, it is detected that a trajectory corresponding to an iteration of the decision tree has reached another decision node. The other decision node can correspond to a decision related to (for example) how to filter (or further filter) a set of workers and/or how to configure a request to be sent to a worker. The other decision node can be configured to make the decision based on processing input data using a machine-learning model (e.g., a different type of model as compared to that used to identify features for feature data sets). The machine-learning model can include (for example) a neural network model.

At block 1425, learned parameters corresponding to the node are retrieved. Learned parameters can include one or more weights for a neural network. The learned parameters may have been generated during a training process where At block 1430, an iteration of the machine-learning model is executed. The machine-learning model can be configured with the node-specific learned parameters. The execution can include inputting the job-associated feature data set and one, more or all of the worker-associated feature data sets to the machine-learning model. In some instances, each worker-associated feature data set is processed with the job-associated feature data set but not with other worker-associated feature data sets (which can be separately processed with the job-associated feature data set). In some instances, all worker-associated feature data sets and the job-associated feature data set are processed in a given execution of the model. A result of the model can include (for example) filtering the set of workers, ranking the set of workers, assigning a score to each of the set of workers, and so on.

Process 1400 may return to block 1420 in instances in which the decision tree includes additional decision nodes using a machine-learning model to make or facilitate a decision. The model may be a same or different type across decision nodes.

At block 1435, one or more communication actions are triggered that represent one or more results generated using machine-learning results produced at one or more decision nodes. For example, a communication may include a request transmitted to a worker to participate in a query process or to accept a job. As another example, a communication may include an identification of one or more workers included in a subset of workers generated at a decision node. As yet another example, a communication may include, for each of one or more workers, a ranking or score generated using a machine-learning model that represents an extent to which that it is predicted that (for example) the worker's specifications correspond to the job specifications, a worker will accept a request to participate in a query process, a worker will accept a request to perform a job, or a worker will successfully perform a job.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method comprising:
accessing a data structure representing a progressive-filtering decision tree for assigning a job, wherein the progressive-filtering decision tree includes a sequenced set of decision nodes and is configured to perform iterative decisions that correspond to progressive filtering of workers, wherein at least one decision node of the sequenced set of decision nodes of the progressive-filtering decision tree: (i) corresponds to an iterative decision of the iterative decisions; and (ii) is configured to identify, from the workers, an incomplete subset of the workers for performing the job, the incomplete subset of the workers being inputted for a subsequent decision node of the sequenced set of decision nodes, and wherein, for each decision node of the sequenced set of decision nodes, each of one or more trajectory extensions to the decision node triggers an intermediate or final decision pertaining to configuring a worker request to perform the job;
initiating a trajectory of the progressive-filtering decision tree, the trajectory being associated with a set of workers for potential assignment of the job;
detecting that the trajectory has reached a first decision node of the sequenced set of decision nodes in the progressive-filtering decision tree;

retrieving a first set of node-specific learned parameters generated by training a first machine-learning model with a first training data set, wherein the first set of node-specific learned parameters defines how unstructured data is to be transformed into structured feature data;

accessing a plurality of worker-associated unstructured data sets, each of the plurality of worker-associated unstructured data sets corresponding to a worker of the set of workers and including unstructured data; and executing one or more first iterations of the first machine-learning model configured with the first set of node-specific learned parameters and using the plurality of worker-associated unstructured data sets, wherein the execution of the one or more first iterations of the first machine-learning model generates a first result that includes a plurality of worker feature data sets, each of the plurality of worker feature data sets corresponding to a worker of the set of workers and indicating an extent to which the worker-associated unstructured data set corresponding to the worker represents each of a set of features, wherein each of the plurality of worker feature data sets is structured data, and wherein the set of features is defined based on the first set of node-specific learned parameters;

identifying, based on the plurality of worker feature data sets, a subset of the set of workers for continued evaluation for the job;

detecting that the trajectory has reached a second decision node of the sequenced set of decision nodes in the progressive-filtering decision tree;

retrieving a second set of node-specific learned parameters generated by training a second machine-learning model with a second training data set, wherein the second set of node-specific learned parameters defines how structured data is to be transformed;

executing one or more second iterations of the second machine-learning model configured with the second set of node-specific learned parameters and using a subset of the plurality of worker feature data sets, wherein each of the subset of the plurality of worker feature data sets corresponds to a worker in the subset of the set of workers, and wherein execution of the one or more second iterations of the second machine-learning model generates a second result that indicates, for each worker of at least one of the subset of the set of workers, an estimated absolute or relative degree of correspondence between the job and the worker; and triggering a communication action that represents the second result.

2. The method of claim 1, further comprising:

identifying a plurality of key-value pairs, wherein each of the plurality of key-value pairs corresponds to a worker of the subset of the set of workers;

wherein the execution of the one or more second iterations of the second machine-learning model further uses the plurality of key-value pairs, and wherein the execution of the one or more first iterations of the first machine-learning model does not use the plurality of key-value pairs.

3. The method of claim 1, further comprising:

learning the first set of node-specific learned parameters using an unsupervised learning process; and learning the second set of node-specific learned parameters using a supervised learning process.

4. The method of claim 1, wherein each worker feature data set of the plurality of worker feature data sets includes a vector, matrix or array, and wherein the vector, matrix or array has a predefined dimensionality.

5. The method of claim 1, further comprising:

accessing a job unstructured data set that corresponds to the job;

executing another iteration of the first machine-learning model configured with the first set of node-specific learned parameters and using the job unstructured data set, wherein execution of the other iteration of the first machine-learning model generates a job feature data set that indicates an extract to which the job unstructured data set represents each of the set of features; and generating, for each worker of the set of workers, a job-comparison metric based on the worker feature data set corresponding to the worker and the job feature data set, wherein the subset of the set of workers is identified based on the job-comparison metrics generated for the set of workers.

6. The method of claim 1, further comprising training, with the first training data set, the first machine-learning model to learn the first set of node-specific learned parameters, wherein the first training data set includes other unstructured data, and wherein the first set of node-specific learned parameters associate particular semantic characteristics with an experience level, skill or job characteristic.

7. The method of claim 1, further comprising:

detecting that the trajectory has reached a third decision node of the sequenced set of decision nodes in the progressive-filtering decision tree; and executing a third iteration of a third machine-learning model configured with a third set of node-specific learned parameters and using at least one of the plurality of worker feature data sets, wherein a third result of the execution of the third iteration of the third machine-learning model represents one or more request configurations predicted to result in an acceptance of a request, configured with the one or more request configurations, that a particular worker of the subset perform the job.

8. The method of claim 1, wherein triggering the communication action includes transmitting, to a user device, a communication that includes the second result.

9. The method of claim 1, wherein one or more workers from amongst the set of workers are identified, based on the second result, for requesting participation in a query process, and wherein the method further includes:

transmitting, for each worker of the one or more workers, a request to participate in the query process to a device associated with the worker.

10. The method of claim 1, wherein the second result includes, for each worker of the subset of the set of workers, a ranking of the worker or a score for the worker.

11. The method of claim 1, further comprising:

detecting that the trajectory has reached a second decision node of the sequenced set of decision nodes in the progressive-filtering decision tree;

identifying a particular worker to which a request to perform the job is to be provided; and triggering another communication that identifies the particular worker or that is transmitted to the particular worker.

12. A computer-program product tangibly embodied in a non-transitory machine-readable storage medium, including instructions configured to cause one or more data processors to perform actions including:

accessing a data structure representing a progressive-filtering decision tree for assigning a job, wherein the progressive-filtering decision tree includes a sequenced set of decision nodes and is configured to perform iterative decisions that correspond to progressive filtering of workers, wherein at least one decision node of the sequenced set of decision nodes of the progressive-filtering decision tree: (i) corresponds to an iterative decision of the iterative decisions; and (ii) is configured to identify, from the workers, an incomplete subset of the workers for performing the job, the incomplete subset of the workers being inputted for a subsequent decision node of the sequenced set of decision nodes, and wherein, for each decision node of the sequenced set of decision nodes, each of one or more trajectory extensions to the decision node triggers an intermediate or final decision pertaining to configuring a worker request to perform the job;

initiating a trajectory of the progressive-filtering decision tree, the trajectory being associated with a set of workers for potential assignment of the job;

detecting that the trajectory has reached a first decision node of the sequenced set of decision nodes in the progressive-filtering decision tree;

retrieving a first set of node-specific learned parameters generated by training a first machine-learning model with a first training data set, wherein the first set of node-specific learned parameters defines how unstructured data is to be transformed into structured feature data;

accessing a plurality of worker-associated unstructured data sets, each of the plurality of worker-associated unstructured data sets corresponding to a worker of the set of workers and including unstructured data; and executing one or more first iterations of the first machine-learning model configured with the first set of node-specific learned parameters and using the plurality of worker-associated unstructured data sets, wherein the execution of the one or more first iterations of the first machine-learning model generates a first result that includes a plurality of worker feature data sets, each of the plurality of worker feature data sets corresponding to a worker of the set of workers and indicating an extent to which the worker-associated unstructured data set corresponding to the worker represents each of a set of features, wherein each of the plurality of worker feature data sets is structured data, and wherein the set of features is defined based on the first set of node-specific learned parameters;

identifying, based on the plurality of worker feature data sets, a subset of the set of workers for continued evaluation for the job;

detecting that the trajectory has reached a second decision node of the sequenced set of decision nodes in the progressive-filtering decision tree;

retrieving a second set of node-specific learned parameters generated by training a second machine-learning model with a second training data set, wherein the second set of node-specific learned parameters defines how structured data is to be transformed;

executing one or more second iterations of the second machine-learning model configured with the second set of node-specific learned parameters and using a subset of the plurality of worker feature data sets, wherein each of the subset of the plurality of worker feature data sets corresponds to a worker in the subset of the set of workers, and wherein execution of the one or more second iterations of the second machine-learning model generates a second result that indicates, for each worker of at least one of the subset of the set of workers, an estimated absolute or relative degree of correspondence between the job and the worker; and triggering a communication action that represents the second result.

13. The computer-program product of claim 12, wherein the actions further include:
identifying a plurality of key-value pairs, wherein each of the plurality of key-value pairs corresponds to a worker of the subset of the set of workers;
wherein the execution of the one or more second iterations of the second machine-learning model further uses the plurality of key-value pairs, and wherein the execution of the one or more first iterations of the first machine-learning model does not use the plurality of key-value pairs.

14. The computer-program product of claim 12, wherein the actions further include:
learning the first set of node-specific learned parameters using an unsupervised learning process; and
learning the second set of node-specific learned parameters using a supervised learning process.

15. The computer-program product of claim 12, wherein each worker feature data set of the plurality of worker feature data sets includes a vector, matrix or array, and wherein the vector, matrix or array has a predefined dimensionality.

16. The computer-program product of claim 12, wherein the actions further include:
accessing a job unstructured data set that corresponds to the job;
executing another iteration of the first machine-learning model configured with the first set of node-specific learned parameters and using the job unstructured data set, wherein execution of the other iteration of the first machine-learning model generates a job feature data set that indicates an extract to which the job unstructured data set represents each of the set of features; and
generating, for each worker of the set of workers, a job-comparison metric based on the worker feature data set corresponding to the worker and the job feature data set, wherein the subset of the set of workers is identified based on the job-comparison metrics generated for the set of workers.

17. The computer-program product of claim 12, wherein the actions further include training, with the first training data set, the first machine-learning model to learn the first set of node-specific learned parameters, wherein the first training data set includes other unstructured data, and wherein the first set of node-specific learned parameters associate particular semantic characteristics with an experience level, skill or job characteristic.

18. The computer-program product of claim 12, wherein the actions further include:
detecting that the trajectory has reached a third decision node of the sequenced set of decision nodes in the progressive-filtering decision tree; and
executing a third iteration of a third machine-learning model configured with a third set of node-specific learned parameters and using at least one of the plurality of worker feature data sets, wherein a third result of the execution of the third iteration of the third machine-learning model represents one or more request configurations predicted to result in an acceptance of a request, configured with the one or more request configurations, that a particular worker of the subset perform the job.

19. The computer-program product of claim 12, wherein triggering the communication action includes transmitting, to a user device, a communication that includes the second result.

20. A system comprising:
one or more data processors; and
a non-transitory computer readable storage medium containing instructions which when executed on the one or more data processors, cause the one or more data processors to perform actions including:
- accessing a data structure representing a progressive-filtering decision tree for assigning a job, wherein the progressive-filtering decision tree includes a sequenced set of decision nodes and is configured to perform iterative decisions that correspond to progressive filtering of workers, wherein at least one decision node of the sequenced set of decision nodes of the progressive-filtering decision tree: (i) corresponds to an iterative decision of the iterative decisions; and (ii) is configured to identify, from the workers, an incomplete subset of the workers for performing the job, the incomplete subset of the workers being inputted for a subsequent decision node of the sequenced set of decision nodes, and wherein, for each decision node of the sequenced set of decision nodes, each of one or more trajectory extensions to the decision node triggers an intermediate or final decision pertaining to configuring a worker request to perform the job;
- initiating a trajectory of the progressive-filtering decision tree, the trajectory being associated with a set of workers for potential assignment of the job;
- detecting that the trajectory has reached a first decision node of the sequenced set of decision nodes in the progressive-filtering decision tree;
- retrieving a first set of node-specific learned parameters generated by training a first machine-learning model with a first training data set, wherein the first set of node-specific learned parameters defines how unstructured data is to be transformed into structured feature data;
- accessing a plurality of worker-associated unstructured data sets, each of the plurality of worker-associated unstructured data sets corresponding to a worker of the set of workers and including unstructured data; and
- executing one or more first iterations of the first machine-learning model configured with the first set of node-specific learned parameters and using the plurality of worker-associated unstructured data sets, wherein the execution of the one or more first iterations of the first machine-learning model generates a first result that includes a plurality of worker feature data sets, each of the plurality of worker feature data sets corresponding to a worker of the set of workers and indicating an extent to which the worker-associated unstructured data set corresponding to the worker represents each of a set of features, wherein each of the plurality of worker feature data sets is structured data, and wherein the set of features is defined based on the first set of node-specific learned parameters;
- identifying, based on the plurality of worker feature data sets, a subset of the set of workers for continued evaluation for the job;
- detecting that the trajectory has reached a second decision node of the sequenced set of decision nodes in the progressive-filtering decision tree;
- retrieving a second set of node-specific learned parameters generated by training a second machine-learning model with a second training data set, wherein the second set of node-specific learned parameters defines how structured data is to be transformed;
- executing one or more second iterations of the second machine-learning model configured with the second set of node-specific learned parameters and using a subset of the plurality of worker feature data sets, wherein each of the subset of the plurality of worker feature data sets corresponds to a worker in the subset of the set of workers, and wherein execution of the one or more second iterations of the second machine-learning model generates a second result that indicates, for each worker of at least one of the subset of the set of workers, an estimated absolute or relative degree of correspondence between the job and the worker; and
- triggering a communication action that represents the second result.

* * * * *

UNITED STATES PATENT AND TRADEMARK OFFICE
CERTIFICATE OF CORRECTION

PATENT NO. : 11,321,614 B2
APPLICATION NO. : 16/146678
DATED : May 3, 2022
INVENTOR(S) : Roberts et al.

It is certified that error appears in the above-identified patent and that said Letters Patent is hereby corrected as shown below:

On the Title Page

On page 2, Column 2, under Item (56) Other Publications, Line 19, delete "Onlin" and insert -- Online --, therefor.

In the Drawings

On sheet 11 of 14, in FIG. 11, under Reference Numeral 1110, Line 1, delete "Dectect" and insert -- Detect --, therefor.

On sheet 11 of 14, in FIG. 11, under Reference Numeral 1120, Line 1, delete "Dectect" and insert -- Detect --, therefor.

In the Specification

In Column 3, Line 25, delete "the a" and insert -- a --, therefor.

In Column 6, Line 64, delete "confugerer" and insert -- configurator --, therefor.

In Column 10, Line 54, delete "probability." and insert -- probability.) --, therefor.

In Column 12, Line 36, delete "workflow)." and insert -- workflow. --, therefor.

In Column 12, Line 21, delete "310." and insert -- 310). --, therefor.

In Column 21, Line 65, delete "channel." and insert -- channel --, therefor.

In Column 36, Line 55, delete "process where" and insert -- process. --, therefor.

Signed and Sealed this
Thirtieth Day of August, 2022

Katherine Kelly Vidal
*Director of the United States Patent and Trademark Office*